US012757098B2

(12) United States Patent
Goto et al.

(10) Patent No.: US 12,757,098 B2
(45) Date of Patent: Oct. 6, 2026

(54) SATELLITE DATA TRANSMISSION SYSTEM

(71) Applicant: NTT, Inc., Tokyo (JP)

(72) Inventors: Daisuke Goto, Musashino (JP); Fumihiro Yamashita, Musashino (JP); Kiyohiko Itokawa, Musashino (JP); Yasuyoshi Kojima, Musashino (JP); Takeshi Onizawa, Musashino (JP); Kazumitsu Sakamoto, Musashino (JP); Tomoya Kageyama, Musashino (JP)

(73) Assignee: NTT, Inc., Tokyo (JP)

( * ) Notice: Subject to any disclaimer, the term of this patent is extended or adjusted under 35 U.S.C. 154(b) by 251 days.

(21) Appl. No.: 18/728,321

(22) PCT Filed: Jan. 19, 2022

(86) PCT No.: PCT/JP2022/001792

§ 371 (c)(1),
(2) Date: Jul. 11, 2024

(87) PCT Pub. No.: WO2023/139689

PCT Pub. Date: Jul. 27, 2023

(65) Prior Publication Data

US 2025/0097816 A1 Mar. 20, 2025

(51) Int. Cl.

*H04W 40/06* (2009.01)
*H04W 48/16* (2009.01)
*H04W 76/10* (2018.01)

(52) U.S. Cl.

CPC .......... *H04W 40/06* (2013.01); *H04W 48/16* (2013.01); *H04W 76/10* (2018.02)

(58) Field of Classification Search

CPC ..... H04W 40/06; H04W 48/16; H04W 76/10; H04W 40/12; H04W 84/06

See application file for complete search history.

(56) References Cited

U.S. PATENT DOCUMENTS 5,896,558 A 4/1999 Wiedeman
6,985,454 B1 * 1/2006 Wiedeman ......... H04B 7/18589 370/316

(Continued)

FOREIGN PATENT DOCUMENTS

JP H10-271057 A 10/1998
JP 2000224237 A 8/2000
JP 2001177463 A 6/2001

OTHER PUBLICATIONS

Kazumitsu Sakamoto et al, "Capacity evaluation for each LPWA terminal in 920 MHz band IoT platform via LEO satellite", IEICE Technical Report, SAT2020-35, Feb. 2021, pp. 35-40.

*Primary Examiner* — Sun Jong Kim
(74) *Attorney, Agent, or Firm* — Harness, Dickey & Pierce, P.L.C.

(57) ABSTRACT

A wireless communication system includes a first communication apparatus that moves, a second communication apparatus that moves, and a reception apparatus. A first control unit of the first communication apparatus, when an own apparatus can communicate with any of the reception apparatuses, transmits transmission data acquired by the own apparatus from a first communication unit to the reception apparatus, and, when the own apparatus cannot communicate with any of the reception apparatuses, transmits the transmission data from a second communication unit to the second communication apparatus capable of communicating with the own apparatus. A second control unit of the second communication apparatus transmits the transmission data received by a third communication unit from the first communication apparatus from a fourth communication unit to a reception apparatus capable of communicating with the own apparatus.

13 Claims, 15 Drawing Sheets

(56) References Cited

U.S. PATENT DOCUMENTS

| | | | | |
|---|---|---|---|---|
| 2012/0327847 | A1* | 12/2012 | Rundquist | H04L 47/10 |
| | | | | 370/316 |
| 2020/0259560 | A1* | 8/2020 | Tong | H04B 7/195 |

* cited by examiner

EARTH STATION COMMUNICATION INFORMATION

| LEO SATELLITE | TIME SECTION | | COMMUNICATION DESTINATION |
|---|---|---|---|
| | START TIME | END TIME | |
| LEO SATELLITE #1 | t11 | t12 | GWL#1 |
| | t13 | t14 | GWL#2 |
| | : | : | : |

SATELLITE COMMUNICATION INFORMATION

| LEO SATELLITE | TIME SECTION | | COMMUNICATION DESTINATION |
|---|---|---|---|
| | START TIME | END TIME | |
| LEO SATELLITE #1 | t12 | t13 | GEO SATELLITE #1 |
| | t21 | t22 | GEO SATELLITE #2 |
| | : | : | : |

ROUTING INFORMATION

| LEO SATELLITE | TIME SECTION | | ROUTE |
|---|---|---|---|
| | START TIME | END TIME | |
| LEO SATELLITE #1 | t11 | t12 | LEO SATELLITE #1→GWL#1 |
| | t12 | t13 | LEO SATELLITE #1→LEO SATELLITE #2 →GWL#2 |
| | t13 | t14 | LEO SATELLITE #1→LEO SATELLITE #2 →LEO SATELLITE #3→GWL#3 |
| | : | : | : |

Fig. 13

SATELLITE DATA TRANSMISSION SYSTEM

CROSS-REFERENCE TO RELATED APPLICATIONS

This application is a 371 U.S. National Phase of International Application No. PCT/JP2022/001792, filed on Jan. 19, 2022. The entire disclosure of the above application is incorporated herein by reference.

TECHNICAL FIELD

The present invention relates to wireless communication system, communication apparatus and wireless communication method.

BACKGROUND ART

With the development of Internet of Things (IoT) technology, it has been studied to install IoT terminals including various sensors in various places. The IoT terminals may be installed in a place where it is difficult to install a base station, such as a buoy or a ship on the sea or a mountainous area. Therefore, it is considered that data collected by IoT terminals installed in various places is relayed to an earth station via a low earth orbit (LEO) satellite equipped with a communication apparatus.

Conventionally, LEO satellites receive data from IoT terminals by an autonomous distributed control low power wide area (LPWA) scheme under the condition that the communication environment has high periodicity and reproducibility. The LEO satellite stores waveform information of an LPWA reception signal in a memory of the on-board device. The LEO satellite transmits the stored waveform information by downlink transmission in a situation where communication with the earth station is possible (see, for example, Non Patent Literature 1).

CITATION LIST

Non Patent Literature

Non Patent Literature 1: Kazumitsu Sakamoto, and 6 others, "Capacity evaluation for each LPWA terminal in 920 MHz band IoT platform via LEO satellite", IEICE Technical Report, SAT2020-35, February 2021, pp. 35-40

SUMMARY OF INVENTION

Technical Problem

In the existing technology, a communication environment between the LEO satellite and the antenna of the earth station is considered, but a condition that a sufficient feeder link network cannot be obtained is not considered. That is, when a sufficient feeder link network cannot be obtained, the LEO satellite accumulates data to be transmitted to the earth station. Thus, the time from when the LEO satellite receives data from the IoT terminal to when the LEO satellite transmits the data to the earth station becomes long in some cases.

In view of the above circumstances, an object of the present invention is to provide a wireless communication system, a communication apparatus, a wireless communication method and a program capable of shortening a time required for transmitting data to a transmission destination even in a case where there is a period in which a communication apparatus that moves cannot directly communicate with the data transmission destination.

Solution to Problem

An aspect of the present invention is a wireless communication system including one or more first communication apparatuses that move, one or more second communication apparatuses that move, and one or more reception apparatuses, in which the first communication apparatus includes a first communication unit (hereinafter also referred to as "first transceiver") that wirelessly communicates with the reception apparatus, a second communication unit (hereinafter also referred to as "second transceiver") that wirelessly communicates with the second communication apparatus, and a first control unit (hereinafter also referred to as "first controller") that, when an own apparatus can communicate with any of the reception apparatuses, transmits transmission data acquired by the own apparatus from the first communication unit to the reception apparatus, and, when the own apparatus cannot communicate with any of the reception apparatuses, transmits the transmission data from the second communication unit to the second communication apparatus capable of communicating with the own apparatus, and the second communication apparatus includes a third communication unit (hereinafter also referred to as "third transceiver") that wirelessly communicates with the first communication apparatus, a fourth communication unit (hereinafter also referred to as "fourth transceiver") that wirelessly communicates with the reception apparatus, and a second control unit (hereinafter also referred to as "second controller") that transmits the transmission data received by the third communication unit from the first communication apparatus from the fourth communication unit to the reception apparatus capable of communicating with the own apparatus.

An aspect of the present invention is a communication apparatus in a wireless communication system including a plurality of the communication apparatuses that moves and one or more reception apparatuses, the communication apparatus including: a first communication unit that wirelessly communicates with the reception apparatus; a second communication unit that wirelessly communicates with another communication apparatus; and a control unit (hereinafter also referred to as "controller") that, when an own apparatus can communicate with any of the reception apparatuses, transmits transmission data acquired by the own apparatus from the first communication unit to the reception apparatus, and, when the own apparatus cannot communicate with any of the reception apparatuses, transmits the transmission data from the second communication unit to another communication apparatus capable of communicating with the own apparatus and any of the reception apparatuses.

An aspect of the present invention is a wireless communication method of a wireless communication system including one or more first communication apparatuses that move, one or more second communication apparatuses that move, and one or more reception apparatuses, the wireless communication method including: a transmission step of, when an own apparatus can communicate with any of the reception apparatuses, transmitting, by the first communication apparatus, transmission data acquired by the own apparatus from a first communication unit that wirelessly communicates with the reception apparatus to the reception apparatus, and, when the own apparatus cannot communicate with any of the reception apparatuses, transmitting the transmission data from a second communication unit that wirelessly communicates with the second communication apparatus to the second communication apparatus that can communicate with the own apparatus; and a relay step of transmitting, by the second communication apparatus, the transmission data received from the first communication apparatus by a third communication unit that wirelessly communicates with the first communication apparatus from a fourth communication unit that wirelessly communicates with the reception apparatus to the reception apparatus capable of communicating with the own apparatus.

An aspect of the present invention is a wireless communication method of a communication apparatus in a wireless communication system including a plurality of the communication apparatuses that moves and one or more reception apparatuses, the wireless communication method including: a transmission step of, when an own apparatus can communicate with any of the reception apparatuses, transmitting transmission data acquired by the own apparatus from a first communication unit that wirelessly communicates with the reception apparatus to the reception apparatus, and, when the own apparatus cannot communicate with any of the reception apparatuses, transmitting the transmission data from a second communication unit that wirelessly communicates with another communication apparatus to another communication apparatus capable of communicating with the own apparatus and any of the reception apparatuses.

Advantageous Effects of Invention

According to the present invention, it is possible to shorten a time required for transmitting data to a transmission destination even in a case where there is a period in which a communication apparatus that moves cannot directly communicate with the data transmission destination.

BRIEF DESCRIPTION OF DRAWINGS

FIG. 13 is a diagram illustrating an example of routing information according to the embodiment.

DESCRIPTION OF EMBODIMENTS

Hereinafter, embodiments of the present invention will be described in detail with reference to the drawings.

First Embodiment

Figure 1:
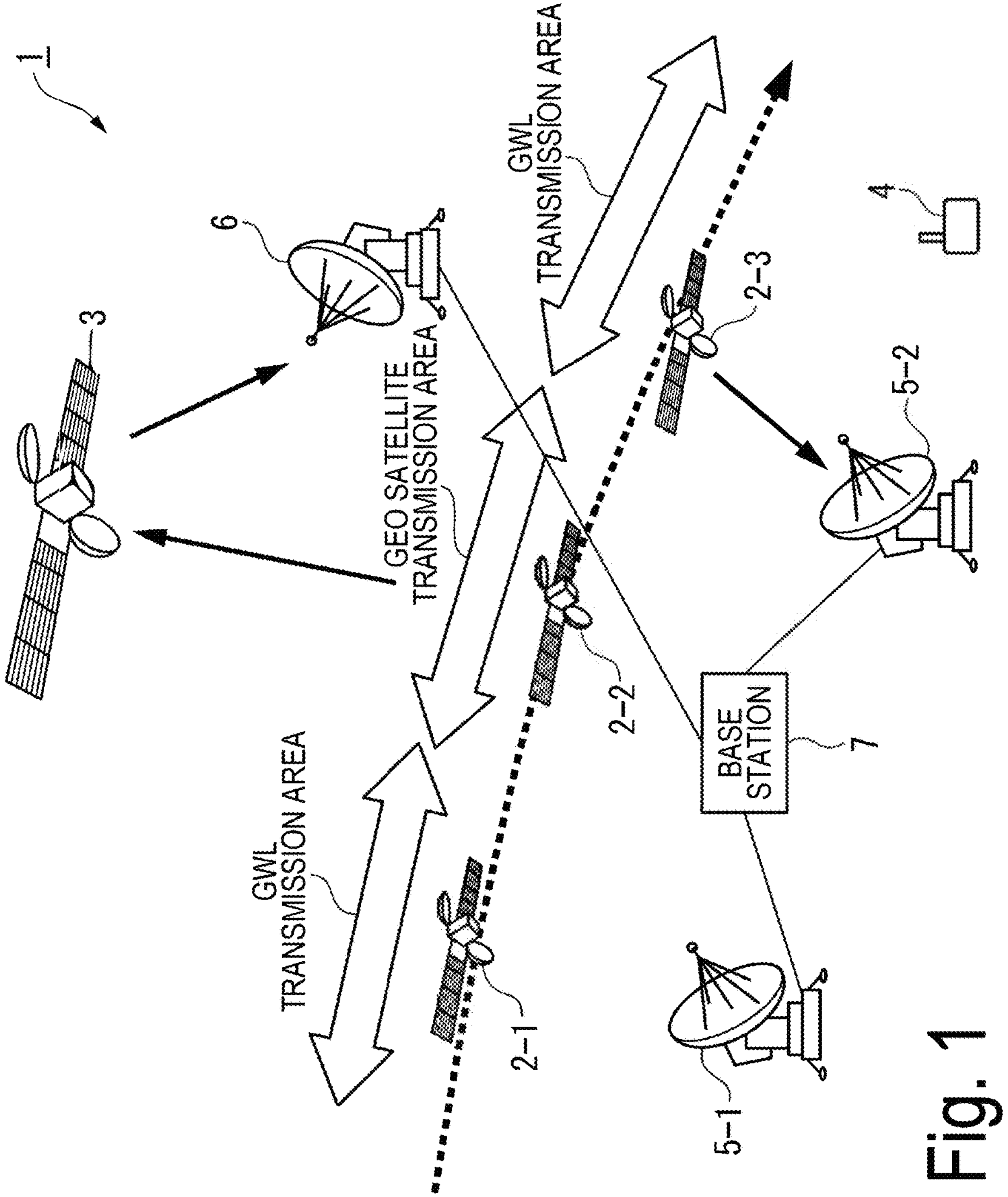
FIG. 1 is a diagram for describing a wireless communication system according to a first embodiment.

FIG. 1 is a diagram for describing an outline of a wireless communication system 1 according to a first embodiment of the present invention. The wireless communication system 1 includes a low earth orbit (LEO) satellite 2, and geostationary orbit (GEO) satellite 3, a terminal station 4, a gateway for LEO satellite (GWL) 5, a gateway for GEO satellite (GWG) 6, and a base station 7. The numbers of LEO satellites 2, GEO satellites 3, terminal stations 4, GWLs 5, GWGs 6, and base stations 7 included in the wireless communication system 1 are one or more. However, it is assumed that the number of terminal stations 4 is large. N (N is an integer of 1 or more) LEO satellites 2 will be referred to as LEO satellites 2-1 to 2-N, respectively, and M (M is an integer of 1 or more) GWLs 5 will be referred to as GWLs 5-1 to 5-M, respectively. In the present embodiment, a case where the number N of LEO satellites 2 is two or more and the number of GEO satellites 3 is smaller than N will be described as an example. FIG. 1 illustrates an example in which N=3 and M=2.

The LEO satellite 2 has a property of constantly moving. The LEO satellite 2 has an altitude of 2000 km or less and moves around the earth once every about 1.5 hours. The GEO satellite 3 has an altitude of about 36000 km and moves around the earth once a day. The GEO satellite 3 is always located at the same location in the sky when viewed from the earth. Each of the LEO satellite 2 and the GEO satellite 3 includes a communication apparatus. The communication apparatus included in the LEO satellite 2 will be referred to as a LEO satellite communication apparatus, and the communication apparatus included in the GEO satellite 3 will be referred to as a GEO satellite communication apparatus. The terminal station 4, the GWL 5, the GWG 6, and the base station 7 are installed on the earth such as on the ground or on the sea. The terminal station 4 is, for example, an IoT terminal. The GWL 5 and the GWG 6 are earth stations.

Hereinafter, the LEO satellite 2 and the GEO satellite 3 are also collectively referred to as satellites, and the GWL 5 and the GWG 6 are also collectively referred to as earth stations. In addition, a radio signal from the terminal station 4 to the satellite will be referred to as a terminal uplink signal, a radio signal from the satellite to the terminal station 4 will be referred to as a terminal downlink signal. A radio signal from the earth station to the satellite will be referred to as an earth station uplink signal, a radio signal from the satellite to the earth station will be referred to as an earth station downlink signal.

The LEO satellite 2 communicates with another LEO satellite 2, the GEO satellite 3, the terminal station 4, and the GWL 5. The GEO satellite 3 communicates with the LEO satellite 2, another GEO satellite 3, and the GWG 6. The GEO satellite 3 may communicate with the terminal station 4. The GWL 5 wirelessly communicates with the LEO satellite 2, and communicates with the base station 7 by wire or wirelessly. The GWG 6 wirelessly communicates with the GEO satellite 3, and communicates with the base station 7 by wire or wirelessly.

The LEO satellite 2 acquires observation data observed by a sensor or the like included in an own satellite while moving above the earth. On the other hand, each terminal station 4 collects observation data such as environmental data observed by a sensor or the like provided inside or outside the own station. Each terminal station 4 transmits a terminal uplink signal in which the collected observation data is set to the LEO satellite 2. The LEO satellite 2 receives the terminal uplink signal transmitted from each of the plurality of terminal stations 4 while moving above the earth.

It is conceivable that the data from the terminal station 4 is received by a communication apparatus mounted on the GEO satellite 3 or an unmanned aerial vehicle such as a drone or a high altitude platform station (HAPS). However, the GEO satellite 3 has a wide coverage area (footprint) on the ground, but has a very small link budget with respect to the terminal station 4 installed on the ground because its altitude is high. On the other hand, in the case of the communication apparatus mounted on a drone or a HAPS, the link budget is high, but the coverage area is small. Furthermore, the drone requires a battery, and the HAPS requires a solar panel. Thus, the LEO satellite 2 receives the observation data collected in the terminal station 4. The link budget falls within a limit, and, in addition, the LEO satellite 2 has no air resistance and has low fuel consumption because the LEO satellite 2 moves around the outside of the atmosphere. In addition, the footprint is larger than that in a case where the communication apparatus that performs relay is mounted on the drone or the HAPS. Note that the LEO satellite 2 may acquire either the observation data observed by the own satellite or the observation data received from the terminal station 4.

The plurality of GWLs 5 is dispersedly arranged on the ground. Each LEO satellite 2 that constantly moves wirelessly transmits the acquired observation data to the GWL 5 using an earth station downlink signal. The GWL 5 acquires the observation data from the received earth station downlink signal and transmits the acquired observation data to the base station 7. As a result, the wireless communication system 1 transmits, for example, data observed by the LEO satellite 2 and sensing information collected by the terminal station 4 installed on the ground from the LEO satellite 2 to the GWL 5, and the base station 7 performs a service to provide these pieces of information.

However, the number of LEO satellites 2 may be less than the number capable of forming a satellite constellation. Even when a global service is deployed by a limited number of LEO satellites 2, the wireless communication system 1 according to the present embodiment quickly transmits observation data from the LEO satellites 2 to the base station 7.

The LEO satellite 2 transmits the observation data received from the terminal station 4 using a feeder link while moving. The feeder link is a wireless line between a satellite and an earth station. The orbit of the LEO satellite 2 may pass through an area in which communication with the GWL 5 is not possible. In this case, as described above, the LEO satellite 2 accumulates observation data and waits for an opportunity to communicate with the GWL 5 next time. As described above, the LEO satellite 2 can store the observation data in a storage while the LEO satellite 2 cannot communicate with the GWL 5. However, considering the limitation of the capacity, it is desirable that the LEO satellite 2 is in a state of being able to constantly communicate with the GWL 5 as much as possible.

In addition, in a case where the wireless communication system 1 is widely deployed not only in a specific area but also globally, observation data is sequentially transmitted from the terminal station 4 on the ground even in a state of waiting for a feeder link. The LEO satellite 2 accumulates the received observation data, which leads to memory tightness. In order to deploy the global service, it is necessary to reduce the time for storing the observation data in the storage of the LEO satellite 2 as much as possible and to obtain the transmission time of the feeder link.

Therefore, the wireless communication system 1 of the present embodiment uses the GEO satellite 3 capable of communicating with the LEO satellite 2 as an alternative means of the feeder link. That is, the GEO satellite 3 receives observation data instead of the GWL 5 from the LEO satellite 2 that cannot communicate with the GWL 5. The GEO satellite 3, which is always at the same location when viewed from the earth, is always able to communicate with the GWG 6. The GEO satellite 3 transmits the received observation data to the base station 7 via the GWG 6.

For example, in FIG. 1, at a certain time, the LEO satellite 2-1 is capable of communication with the GWL 5-1 and the LEO satellite 2-3 is capable of communication with the GWL 5-2. The LEO satellite 2-1 transmits the observation data to the GWL 5-1, and the LEO satellite 2-3 transmits the observation data to the GWL 5-2. Each of the GWL 5-1 and the GWL 5-2 transmits the received observation data to the base station 7. On the other hand, the LEO satellite 2-2 transmits the observation data to the GEO satellite 3, and the GEO satellite 3 transmits the observation data received from the LEO satellite 2-2 to the GWG 6. The GWG 6 transmits the received observation data to the base station 7.

However, the number of GEO satellites 3 is more limited than the number of LEO satellites 2. For example, the line of the GEO satellite 3 is limited. When many LEO satellites 2 are simultaneously connected to the GEO satellite 3, the feeder link line may be congested. Thus, the number of LEO satellites 2 connected to the GEO satellite 3 is reduced as much as possible.

Normally, the orbit of the LEO satellite 2 is determined in advance. That is, at each time, the GWL 5 with which the LEO satellite 2 can communicate is predictable. Therefore, an earth station communicable time section and an earth station uncommunicable time section on the orbit of the LEO satellite 2 are calculated on the basis of the orbit of the LEO satellite 2 and the position of the GWL 5. The earth station communicable time section is a time during which the LEO satellite 2 is located in an area in which communication with any of the GWLs 5 is possible. The earth station uncommunicable time section is a time section other than the earth station communicable time section. That is, the earth station uncommunicable time section is a time during which the LEO satellite 2 is located in an area in which communication with any of the GWLs 5 is not possible.

In the present embodiment, in a certain time section, the use of the feeder link of a bypass using the GEO satellite 3 is preferentially permitted to the LEO satellite 2 having a long earth station uncommunicable time section. As a result, from the viewpoint of the operation of all the satellites of the wireless communication system 1, a feeder link schedule using the GEO satellite 3 and the GWGs 6 and considering the number of simultaneously connectable satellites of the GEO satellite 3 is created. Thus, it is possible to provide a feeder link network with less waste.

Figure 2:
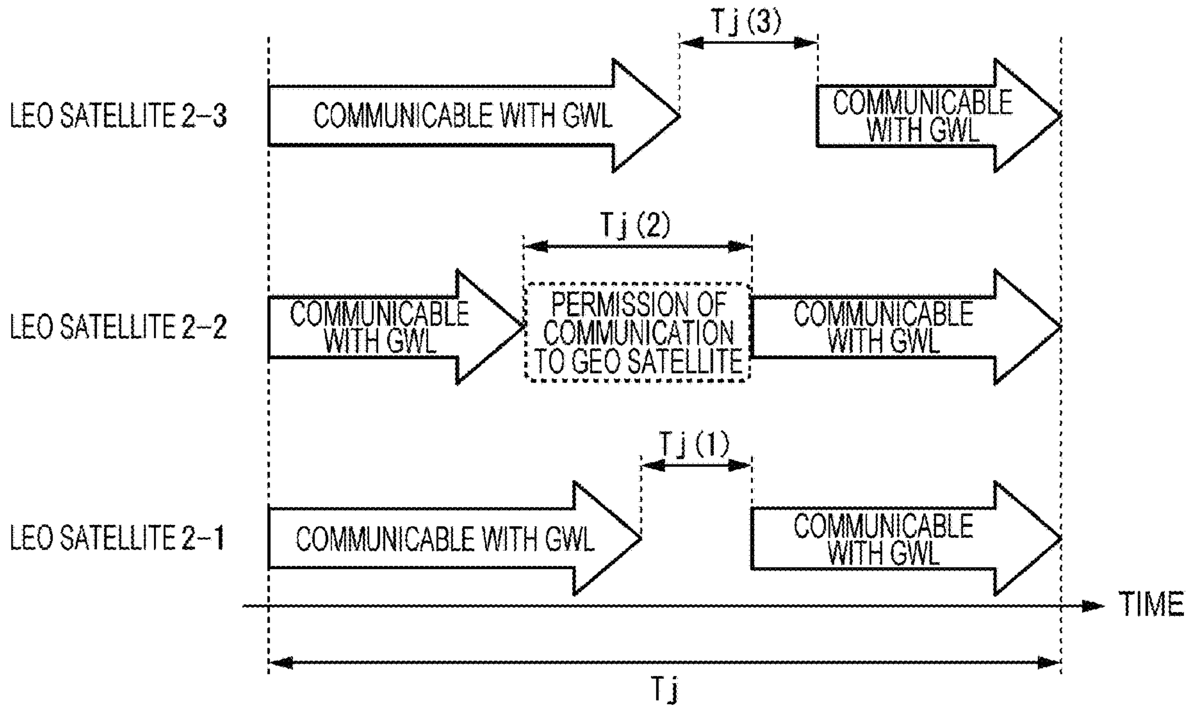
FIG. 2 is a diagram for describing a method of selecting a LEO satellite that is permitted to communicate with a GEO satellite according to the embodiment.

FIG. 2 is a diagram for describing a method of selecting the LEO satellite 2 that is permitted to communicate with the GEO satellite 3. In a j-th (j is an integer of 1 or more) time section Tj, the length of the earth station uncommunicable time section in which a LEO satellite 2-*n* cannot communicate with any of the GWLs 5 is set as time Tj (n). In addition, the number of LEO satellites 2 that can simultaneously communicate with the GEO satellite 3 is set to K (K is an integer of 1 or more). In this case, in the time section Tj (n), the K LEO satellites 2 are selected in descending order of the earth station uncommunicable time section among the LEO satellites 2 in which the earth station uncommunicable time sections overlap. The selected apparatuses are permitted to connect to the GEO satellite 3 in the earth station uncommunicable time section. In FIG. 2, time Tj (1)<time Tj (3)<time Tj (2) holds. When K=1, the LEO satellite 2-2 is permitted to connect to the GEO satellite 3 in the earth station uncommunicable time.

Figure 3:
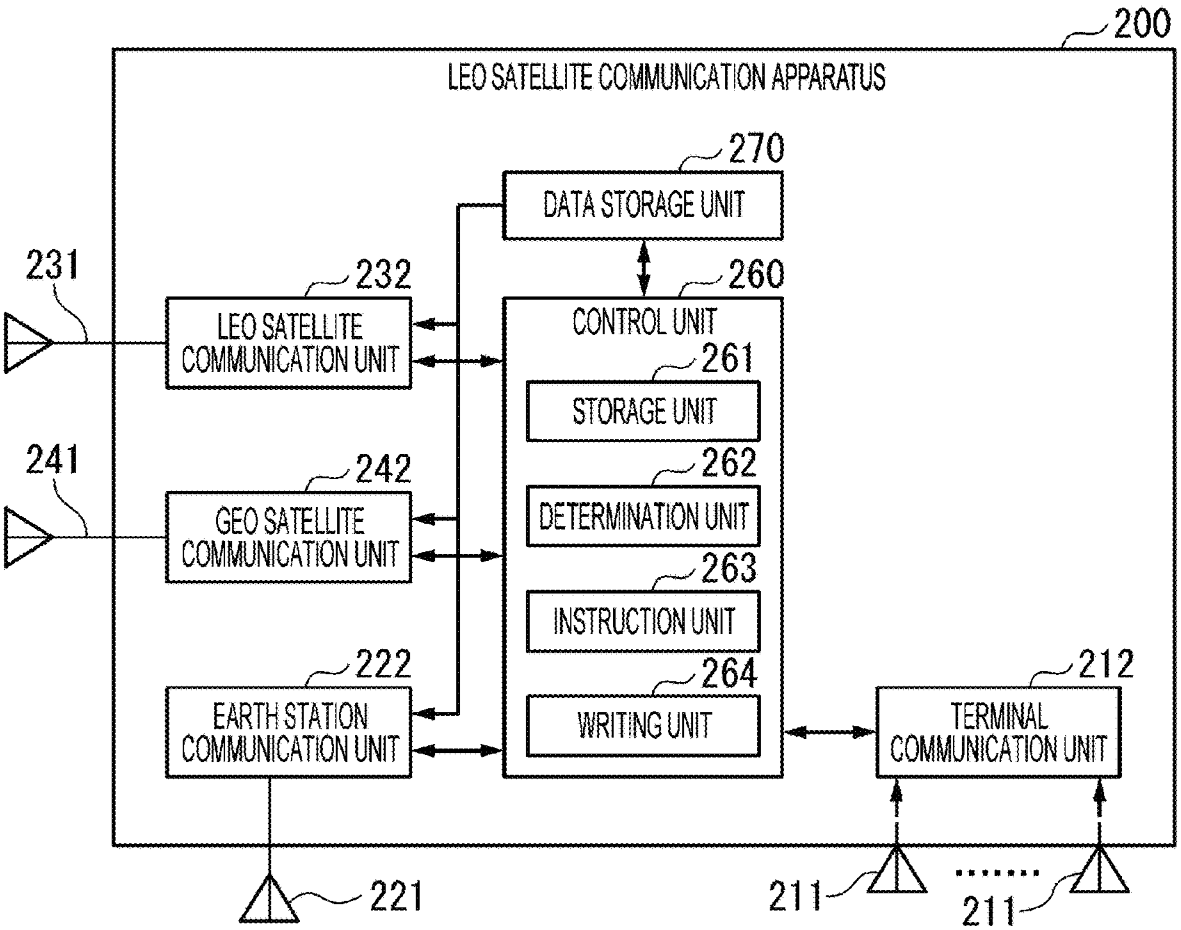
FIG. 3 is a block diagram illustrating a configuration of a LEO satellite communication apparatus according to the embodiment.

Next, a configuration of each apparatus will be described. FIG. 3 is a block diagram illustrating a configuration of a LEO satellite communication apparatus 200 included in the LEO satellite 2. In FIG. 3, only functional blocks related to the present embodiment are extracted and illustrated. The LEO satellite communication apparatus 200 includes an antenna 211, a terminal communication unit 212, an antenna 221, an earth station communication unit 222, an antenna 231, a LEO satellite communication unit 232, an antenna 241, a GEO satellite communication unit 242, a control unit 260, and a data storage unit 270. The number of each of the antennas 211, 221, 231, and 241 is arbitrary.

The antenna 211 receives a terminal uplink signal from the terminal station 4. In addition, the antenna 211 transmits a terminal downlink signal addressed to the terminal station 4. The terminal communication unit 212 performs reception processing of the terminal uplink signal received by the antenna 211. The terminal communication unit 212 outputs the observation data acquired from the terminal uplink signal by the reception processing to the control unit 260. The terminal communication unit 212 generates a terminal downlink signal in which transmission data is set and transmits the terminal downlink signal through the antenna 211.

The antenna 221 receives an earth station uplink signal from the GWL 5. In addition, the antenna 221 transmits an earth station downlink signal addressed to the GWL 5. The earth station communication unit 222 performs reception processing of the earth station uplink signal received by the antenna 221. In addition, the earth station communication unit 222 generates an earth station downlink signal in which transmission data is set and transmits the earth station downlink signal through the antenna 221.

The antenna 231 transmits and receives a radio signal to and from another LEO satellite 2. The LEO satellite communication unit 232 performs reception processing of the radio signal received by the antenna 231. In addition, the LEO satellite communication unit 232 generates a radio signal addressed to another LEO satellite 2, and transmits the radio signal through the antenna 231.

The antenna 241 transmits and receives a radio signal to and from the GEO satellite 3. The GEO satellite communication unit 242 performs reception processing of the radio signal received by the antenna 241. In addition, the GEO satellite communication unit 242 generates a radio signal addressed to the GEO satellite 3, and transmits the radio signal through the antenna 241.

The control unit 260 includes a storage unit 261, a determination unit 262, an instruction unit 263, and a writing unit 264. The storage unit 261 stores communication information. The communication information indicates the communication destination GWL 5 or GEO satellite 3 in each time section of the LEO satellite 2. For example, the communication information includes earth station communication information and satellite communication information. The earth station communication information is information indicating the communication destination GWL 5 in each time section of the LEO satellite 2. The satellite communication information is information indicating the GEO satellite 3 with which the LEO satellite 2 is permitted to communicate and a time section in which communication with the GEO satellite 3 is permitted. The time section is indicated by a start time and an end time.

The determination unit 262 refers to the communication information to determine whether the own apparatus can currently transmit observation data to the GWL 5 or the GEO satellite 3, and further determines the transmission destination of the observation data when communication is possible. Specifically, when the communication destination GWL 5 is set in association with the time section including the current time in the earth station communication information, the determination unit 262 determines that the observation data can be transmitted to the GWL 5. The determination unit 262 determines the GWL 5 associated with the time section as the transmission destination of the observation data. In addition, when the GEO satellite 3 for which communication is permitted is set in association with the time section including the current time in the satellite communication information, the determination unit 262 determines that the observation data can be transmitted to the GEO satellite 3. The determination unit 262 determines the GEO satellite 3 for which communication is permitted as the transmission destination of the observation data. In a case where the GWL 5 corresponding to the time section including the current time is not set in the earth station communication information, and the GEO satellite 3 corresponding to the time section including the current time is not set in the satellite communication information, the determination unit 262 determines that the observation data cannot be transmitted. When determining that the observation data can be transmitted to the GWL 5 or the GEO satellite 3, the determination unit 262 notifies the instruction unit 263 of the transmission destination. When determining that the transmission of the observation data is impossible, the determination unit 262 instructs the writing unit 264 to accumulate the observation data.

When the transmission destination received from the determination unit 262 is the GWL 5, the instruction unit 263 outputs the observation data and the address of the transmission destination GWL 5 to the earth station communication unit 222. The earth station communication unit 222 generates a data transmission signal of the earth station downlink signal in which the address of the transmission destination GWL 5 is set as the destination and the observation data is set, and wirelessly transmits the data transmission signal through the antenna 221. In a case where the transmission destination is the GEO satellite 3, the instruction unit 263 outputs the observation data and the address of the transmission destination GEO satellite 3 to the GEO satellite communication unit 242. The GEO satellite communication unit 242 generates a data transmission signal in which the address of the transmission destination GEO satellite 3 is set as the destination and the observation data is set, and wirelessly transmits the generated data transmission signal through the antenna 241. The writing unit 264 writes the observation data in the data storage unit 270.

The data storage unit 270 is a storage that stores data. The data storage unit 270 stores untransmitted observation data. The observation data is one or both of observation data detected by a sensor, which is not illustrated, included in the LEO satellite 2 and observation data received by the terminal communication unit 212 using a terminal uplink signal.

Figure 4:
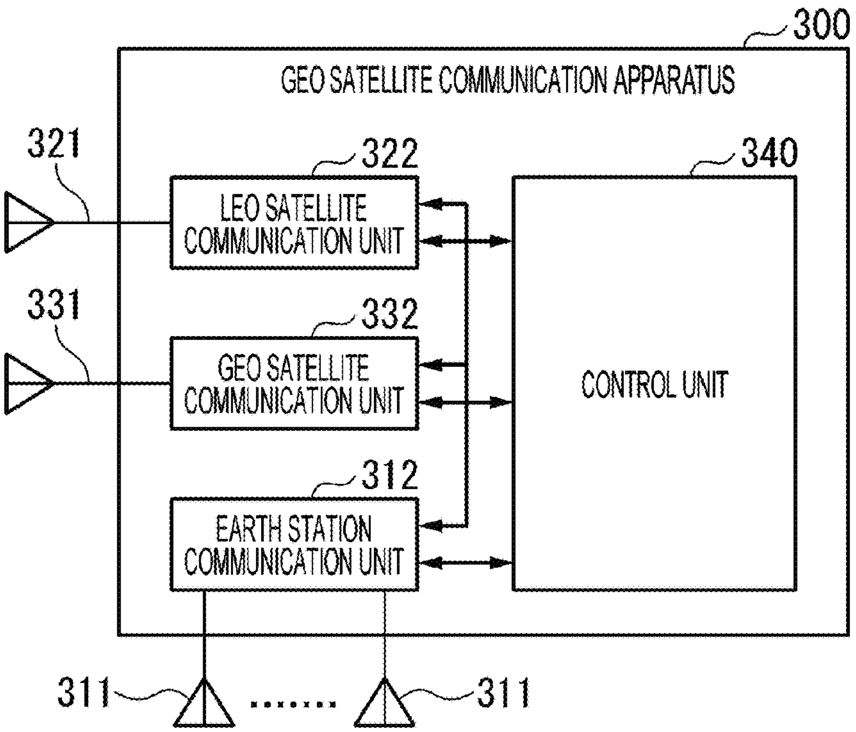
FIG. 4 is a block diagram illustrating a configuration of a GEO satellite communication apparatus according to the embodiment.

FIG. 4 is a block diagram illustrating a configuration of a GEO satellite communication apparatus 300 included in the GEO satellite 3. In FIG. 4, only functional blocks related to the present embodiment are extracted and illustrated. The GEO satellite communication apparatus 300 includes an antenna 311, an earth station communication unit 312, an antenna 321, a LEO satellite communication unit 322, an antenna 331, a GEO satellite communication unit 332, and a control unit 340. The number of each of the antennas 311, 321, and 331 is arbitrary.

The antenna 311 receives an earth station uplink signal from the GWG 6. In addition, the antenna 311 transmits an earth station downlink signal addressed to the GWG 6. The earth station communication unit 312 performs reception processing of the earth station uplink signal received by the antenna 311. In addition, the earth station communication unit 312 generates an earth station downlink signal and transmits the earth station downlink signal through the antenna 311.

The antenna 321 transmits and receives a radio signal to and from the LEO satellite 2. The LEO satellite communication unit 322 performs reception processing of the radio signal received by the antenna 321. In addition, the LEO satellite communication unit 322 generates a radio signal addressed to the LEO satellite 2, and transmits the generated radio signal through the antenna 321.

The antenna 331 transmits and receives a radio signal to and from another GEO satellite 3. The GEO satellite communication unit 332 performs reception processing of the radio signal received by the antenna 331. In addition, the GEO satellite communication unit 332 generates a radio signal addressed to another GEO satellite 3, and transmits the generated radio signal through the antenna 331. The control unit 340 controls each unit.

Figure 5:
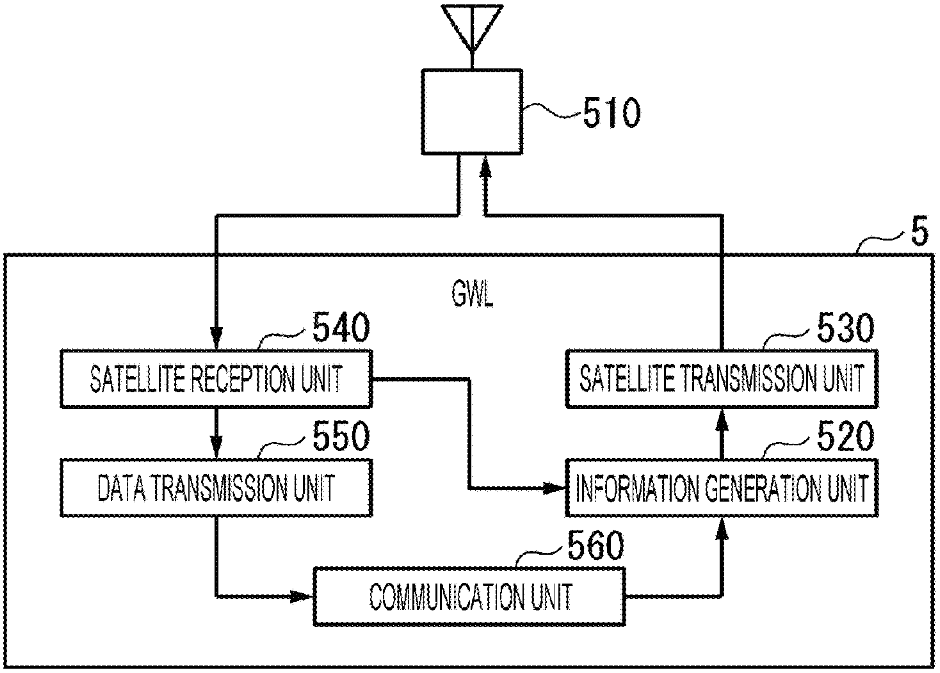
FIG. 5 is a block diagram illustrating a configuration of a gateway for LEO satellite according to the embodiment.

FIG. 5 is a block diagram illustrating a configuration of the GWL 5. In FIG. 5, only functional blocks related to the present embodiment are extracted and illustrated. The GWL 5 includes an antenna station 510, an information generation unit 520, a satellite transmission unit 530, a satellite reception unit 540, a data transmission unit 550, and a communication unit 560.

The antenna station 510 receives an earth station downlink signal from the LEO satellite 2. In addition, the antenna station 510 transmits an earth station uplink signal addressed to the LEO satellite 2.

The information generation unit 520 obtains the earth station communicable time section of each LEO satellite 2 and the GWL 5 communicable in the earth station communicable time section on the basis of a LEO satellite orbit information indicating the orbit of the LEO satellite 2 and an earth station position information indicating the position of the GWL 5. The information generation unit 520 generates the earth station communication information of each LEO satellite 2 on the basis of the obtained information.

Further, the information generation unit 520 specifies the GEO satellite 3 at a communicable position in the earth station uncommunicable time section in which each LEO satellite 2 cannot communicate with any of the GWLs 5 on the basis of the LEO satellite orbit information and a GEO satellite orbit information indicating the orbit of the GEO satellite 3. The GEO satellite orbit information is information from which it is possible to acquire a time-series position of the GEO satellite 3. The information generation unit 520 selects the LEO satellite 2 that is permitted to communicate with the GEO satellite 3 in the earth station uncommunicable time section for each combination of each GEO satellite 3 and each time section. At this time, the information generation unit 520 selects each of a predetermined number of LEO satellites 2 in descending order of the earth station uncommunicable time section. The information generation unit 520 generates satellite communication information in which the earth station uncommunicable time section in which each LEO satellite 2 is permitted to communicate with the GEO satellite 3 is associated with the communication destination GEO satellite 3 in the earth station uncommunicable time section.

The satellite transmission unit 530 generates an earth station uplink signal addressed to the LEO satellite 2 in which the transmission data has been set, and transmits the earth station uplink signal from the antenna station 510. The transmission data is, for example, earth station communication information and satellite communication information generated by the information generation unit 520.

The satellite reception unit 540 performs reception processing of the earth station downlink signal received by the antenna station 510. The data transmission unit 550 transmits observation data obtained by the satellite reception unit 540 performing reception processing of the earth station downlink signal to the base station 7. The communication unit 560 transmits and receives data to and from the base station 7 by wire or wirelessly. The communication unit 560 may transmit and receive data to and from the GWG 6 by wire or wirelessly.

Figures 6, 7, 8:
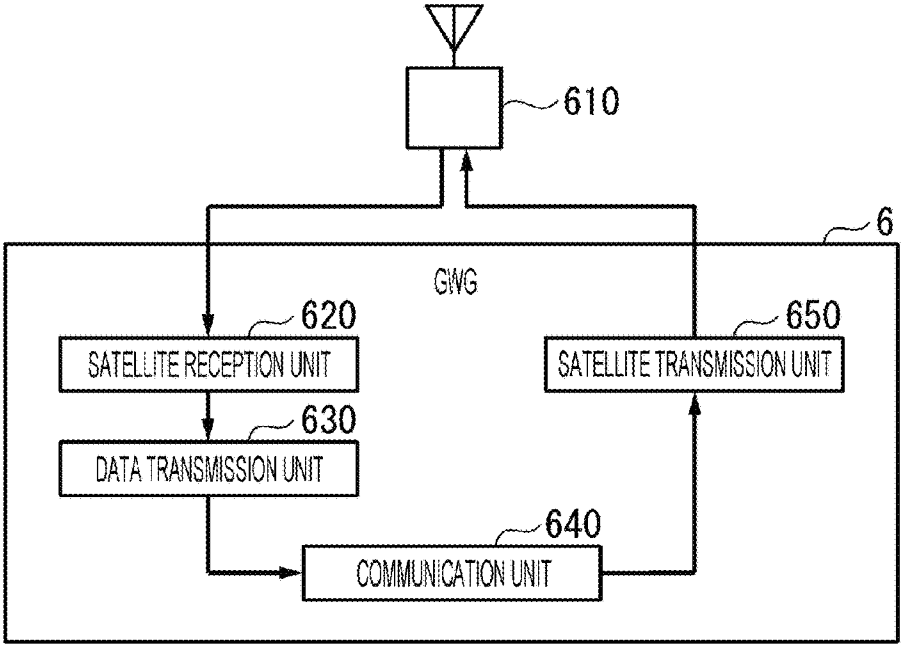
FIG. 6 is a block diagram illustrating a configuration of a gateway for GEO satellite according to the embodiment.
FIG. 7 is a diagram illustrating earth station communication information according to the embodiment.
FIG. 8 is a diagram illustrating satellite communication information according to the embodiment.

FIG. 6 is a block diagram illustrating a configuration of the GWG 6. In FIG. 6, only functional blocks related to the present embodiment are extracted and illustrated. The GWG 6 includes an antenna station 610, a satellite reception unit 620, a data transmission unit 630, a communication unit 640, and a satellite transmission unit 650.

The antenna station 610 receives an earth station downlink signal from the GEO satellite 3. In addition, the antenna station 610 transmits an earth station uplink signal addressed to the GEO satellite 3. The satellite reception unit 620 performs reception processing of the earth station downlink signal received by the antenna station 610. The data transmission unit 630 transmits observation data obtained by the satellite reception unit 620 performing reception processing of the earth station downlink signal to the base station 7. The communication unit 640 transmits and receives data to and from the base station 7 by wire or wirelessly. The communication unit 640 may transmit and receive data to and from the GWL 5 by wire or wirelessly. The satellite transmission unit 650 generates an earth station uplink signal addressed to the GEO satellite 3 in which the transmission data has been set, and transmits the earth station uplink signal from the antenna station 610.

FIG. 7 is a diagram illustrating an example of earth station communication information. The earth station communication information is information in which satellite identification information for specifying the LEO satellite 2, a time section specified by the start time and the end time, and earth station identification information for specifying the communication destination GWL 5 in the time section are associated with each other. The earth station communication information may include information of a time section in which communication with any of the GWLs 5 is impossible. In this case, in the earth station communication information, the communication destination indicating NULL or uncommunicable is set in association with the time section in which communication with the GWL 5 is impossible.

FIG. 8 is a diagram illustrating an example of satellite communication information. The satellite communication information is information in which satellite identification information for specifying the LEO satellite 2, a time section specified by the start time and the end time, and satellite identification information for specifying the communication destination GEO satellite 3 in the time section are associated with each other. The time section is an earth station uncommunicable time section in which the LEO satellite 2 specified by the satellite identification information is permitted to communicate with the GEO satellite 3. The satellite communication information may include information of a time section in which communication with any of the GEO satellites 3 is impossible. In this case, in the satellite communication information, the communication destination indicating NULL or uncommunicable is set in association with the time section in which communication with the GEO satellite 3 is impossible. Note that the earth station communication information and the satellite communication information may be one piece of integrated information.

Figure 9:
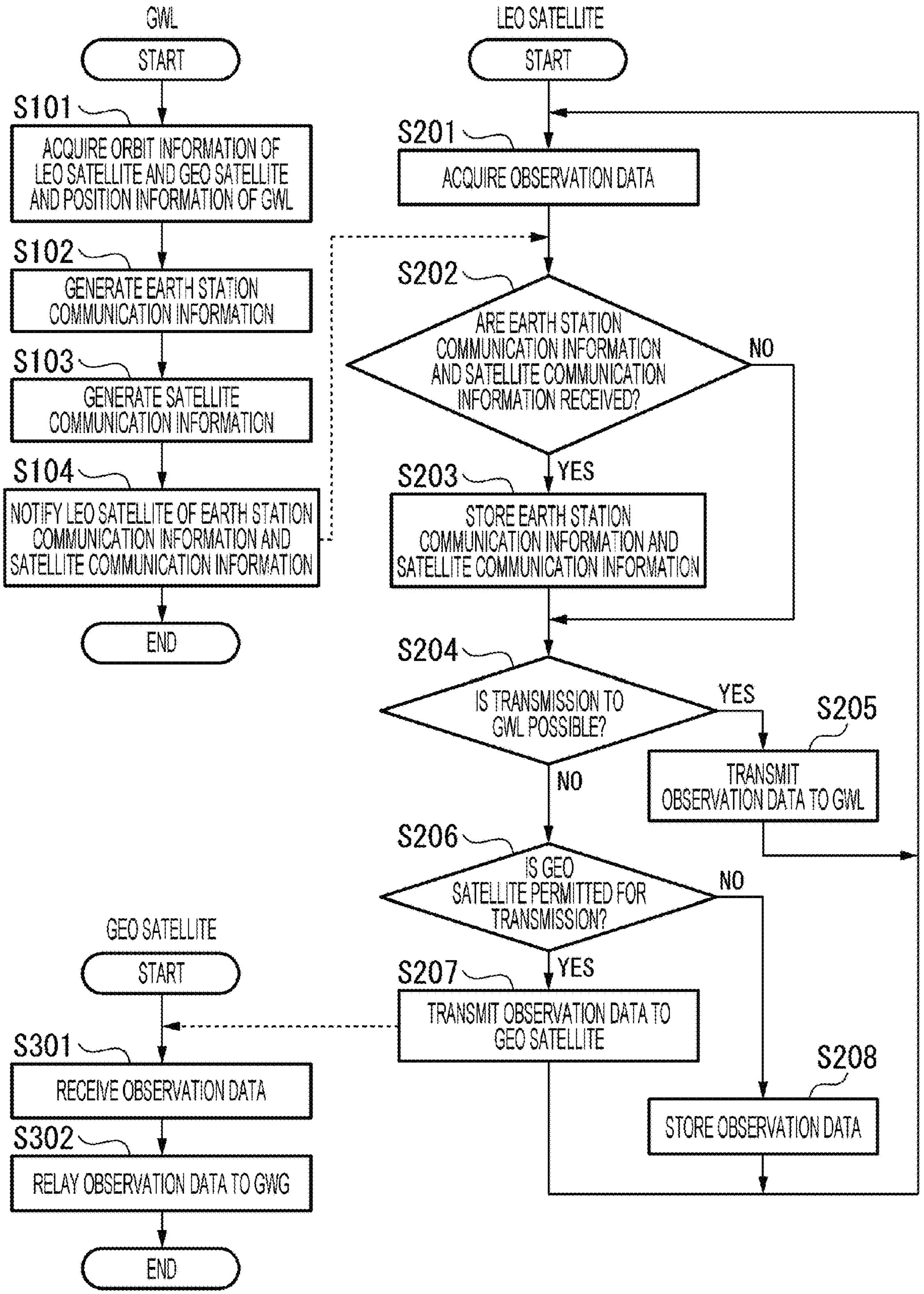
FIG. 9 is a flowchart illustrating processing of the wireless communication system according to the embodiment.

FIG. 9 is a processing flow illustrating operation of the wireless communication system 1.

First, the information generation unit 520 of the GWL 5 acquires LEO satellite orbit information indicating the orbit of each LEO satellite 2, GEO satellite orbit information indicating the orbit of each GEO satellite 3, and earth station position information indicating the position of each GWL 5 (step S101). The information generation unit 520 may acquire these pieces of information at predetermined timing such as periodically, or may acquire these pieces of information when an information acquisition instruction is input by an external apparatus or an input unit, which is not illustrated. In addition, the information generation unit 520 may receive these pieces of information from an external apparatus or may read them from a recording medium. These pieces of information may be input to the GWL 5 by an input unit, which is not illustrated.

The information generation unit 520 calculates an earth station communicable time section, which is a time section in which each LEO satellite 2 can communicate with each GWL 5, on the basis of the position of each LEO satellite 2 at each time indicated by the LEO satellite orbit information and the position of each GWL 5 indicated by the earth station position information. The information generation unit 520 generates earth station communication information for each LEO satellite 2 by associating the earth station communicable time section with the communication destination GWL 5 in the earth station communicable time section (step S102).

Subsequently, the information generation unit 520 calculates a GEO satellite 3 at a position at which each LEO satellite 2 can communicate in the earth station uncommunicable time section on the basis of the position of each LEO satellite 2 at each time indicated by the LEO satellite orbit information and the information of the position of each GEO satellite 3 at each time indicated by the GEO satellite orbit information. In each time section, the information generation unit 520 specifies the LEO satellite 2 at a position communicable with the same GEO satellite 3 in the uncommunicable time section. The information generation unit 520 selects a predetermined number of LEO satellites 2 in descending order of the earth station uncommunicable time section for each group of the LEO satellites 2 specified for each time section. The information generation unit 520 permits the selected LEO satellites 2 to communicate with the GEO satellite 3 in the earth station uncommunicable time. Note that the lengths of the time sections may be the same, or some or all of the time sections may be different. In addition, the value of the number of selected LEO satellites 2 may be changed for each GEO satellite 3. The information generation unit 520 generates satellite communication information in which the earth station uncommunicable time in which communication with the GEO satellite 3 is permitted is associated with the communication destination GEO satellite 3 in the earth station uncommunicable time for each LEO satellite 2 (step S103).

The information generation unit 520 outputs the earth station communication information and the satellite communication information generated for each LEO satellite 2 to the satellite transmission unit 530. The satellite transmission unit 530 generates an earth station uplink signal in which the earth station communication information and the satellite communication information generated for each LEO satellite 2 are set. The satellite transmission unit 530 transmits the earth station uplink signal in which the earth station communication information and the satellite communication information of the LEO satellite 2 are set from the antenna station 510 at a timing at which communication with the LEO satellite 2 is possible (step S104). Note that the satellite transmission unit 530 may transmit the earth station communication information and the satellite communication information generated for all the LEO satellites 2 to each LEO satellite 2.

The LEO satellite communication apparatus 200 of the LEO satellite 2 acquires observation data (step S201). For example, the terminal communication unit 212 receives the terminal uplink signal from the terminal station 4, and outputs observation data acquired from the received terminal uplink signal to the control unit 260. The observation data may be data obtained by demodulating and decoding the terminal uplink signal, or may be a reception waveform of the terminal uplink signal. Alternatively, the control unit 260 acquires observation data from a sensor included in the LEO satellite 2.

When the earth station communication unit 222 receives the earth station uplink signal in which the earth station communication information and the satellite communication information are set from the GWL 5 (step S202: YES), the LEO satellite communication apparatus 200 performs processing of step S203. That is, the storage unit 261 stores the earth station communication information and the satellite communication information acquired from the earth station uplink signal by the earth station communication unit 222

(step S203). After the processing of step S203 or when the earth station uplink signal in which the earth station communication information and the satellite communication information are set is not received (step S202: NO), the LEO satellite communication apparatus 200 performs processing of step S204.

The determination unit 262 of the LEO satellite communication apparatus 200 refers to the earth station communication information stored in the storage unit 261, and determines whether the observation data can be transmitted to the GWL 5 at the current time (step S204).

Note that the determination unit 262 may transmit a transmission permission inquiry to the GWL 5 using an earth station downlink signal in order to determine whether transmission of observation data to the GWL 5 is possible. Upon receiving the transmission permission inquiry, the GWL 5 determines whether data transmission from the LEO satellite communication apparatus 200 to the own station can be performed. The GWL 5 transmits a transmission permission inquiry response in which a determination result is set using an earth station uplink signal. The determination unit 262 of the LEO satellite communication apparatus 200 determines whether transmission of observation data to the GWL 5 is possible according to the transmission permission inquiry response received from the GWL 5.

In addition, the determination unit 262 may determine whether the observation data can be transmitted to the GWL 5 depending on whether congestion occurs with respect to the GWL 5. That is, in a case where congestion does not occur in communication with the GWL 5 in the earth station communication unit 222, the determination unit 262 determines that the observation data can be transmitted. On the other hand, in a case where congestion occurs in communication with the GWL 5 in the earth station communication unit 222 due to overtraffic, the determination unit 262 determines that transmission of observation data is impossible since data cannot be transmitted from the own satellite any more.

Alternatively, the determination unit 262 may determine that the observation data can be transmitted to the GWL 5 when the reception quality of the earth station uplink signal from the GWL 5 in the earth station communication unit 222 is better than a predetermined value, and may determine that the observation data cannot be transmitted to the GWL 5 when the reception quality is equal to or less than the predetermined value. In addition, the determination unit 262 may determine whether it is possible to transmit the observation data to the GWL 5 by combining the above. When the determination unit 262 determines that the observation data can be transmitted to the GWL 5 (step S204: YES), processing of step S205 is performed.

That is, the determination unit 262 reads the time section including the current time and the earth station identification information associated with the time section from the earth station communication information. The determination unit 262 outputs the read time section and earth station identification information to the instruction unit 263. Note that the determination unit 262 outputs the earth station identification information of the GWL 5 that is the transmission source of the transmission permission inquiry response when determining that data transmission is possible on the basis of the transmission permission inquiry response, and outputs the earth station identification information of the GWL 5 that is the transmission source of the earth station uplink signal when determining that data transmission is possible on the basis of the reception quality of the earth station uplink signal. The instruction unit 263 outputs the observation data acquired in step S201 and the address of the GWL 5 indicated by the earth station identification information to the earth station communication unit 222, and instructs transmission. In I addition, in a case where untransmitted observation data is stored in the data storage unit 270, the instruction unit 263 reads the observation data and outputs the read observation data to the earth station communication unit 222. The earth station communication unit 222 wirelessly transmits a data transmission signal of the earth station downlink signal in which the address of the transmission destination GWL 5 is set as the destination and the observation data is set through the antenna 221 (step S205). After the processing of step S205, the LEO satellite communication apparatus 200 repeats the processing from step S201.

The antenna station 510 of the GWL 5 receives the data transmission signal of the earth station downlink signal transmitted from the LEO satellite communication apparatus 200 in step S205. The satellite reception unit 540 performs reception processing on the data transmission signal received by the antenna station 510 to obtain observation data. The data transmission unit 550 transmits the observation data obtained by the satellite reception unit 540 from the communication unit 560 to the base station 7.

Note that, in a case where the transmission of the observation data from the earth station communication unit 222 has not ended by the end time indicated by the time section notification of which has been given from the determination unit 262, the instruction unit 263 instructs the writing unit 264 to write the observation data. The writing unit 264 accumulates untransmitted observation data in the data storage unit 270.

On the other hand, when determining that the observation data cannot be transmitted to the GWL 5 (step S204: NO), the determination unit 262 of the LEO satellite communication apparatus 200 performs processing of step S206. That is, the determination unit 262 refers to the satellite communication information stored in the storage unit 261, and determines whether the transmission of the observation data to the GEO satellite 3 has been permitted at the current time (step S206). Note that the determination unit 262 may transmit a transmission permission inquiry to the GEO satellite 3. Upon receiving the transmission permission inquiry, the GEO satellite 3 determines whether to transmit data from the LEO satellite communication apparatus 200 to the own satellite, and returns a transmission permission inquiry response in which the determination result is set. The determination unit 262 of the LEO satellite communication apparatus 200 determines whether transmission of observation data to the GEO satellite 3 has been permitted according to the transmission permission inquiry response received from the GEO satellite 3. When the determination unit 262 determines that the transmission of the observation data to the GEO satellite 3 has been permitted (step S206: YES), processing of step S207 is performed.

The determination unit 262 reads the time section including the current time and the satellite identification information associated with the time section from the satellite communication information. The determination unit 262 outputs the read time section and satellite identification information to the instruction unit 263. Note that when determining that the transmission of the observation data is permitted on the basis of the transmission permission inquiry response, the determination unit 262 outputs the satellite identification information of the GEO satellite 3 that is the transmission source of the transmission permission inquiry response. The instruction unit 263 outputs the observation data acquired in step S201 and the address of the GEO satellite 3 indicated by the satellite identification information to the GEO satellite communication unit 242, and instructs transmission. I In addition, in a case where untransmitted observation data is stored in the data storage unit 270, the instruction unit 263 reads the observation data and outputs the read observation data to the GEO satellite communication unit 242. The GEO satellite communication unit 242 wirelessly transmits a data transmission signal in which the address of the GEO satellite 3 is set as the destination and the observation data is set through the antenna 241 (step S207).

The antenna 321 of the GEO satellite communication apparatus 300 receives the data transmission signal transmitted from the LEO satellite communication apparatus 200 in step S207 (step S301). The LEO satellite communication unit 322 obtains observation data from the data transmission signal received by the antenna 321. The control unit 340 instructs the earth station communication unit 312 to transmit the observation data acquired by the LEO satellite communication unit 322. The earth station communication unit 312 generates a data transmission signal of the earth station downlink signal in which the observation data obtained by the LEO satellite communication unit 322 is set, and transmits the generated data transmission signal from the antenna 311 (step S302). The antenna station 610 of the GWG 6 receives the data transmission signal transmitted from the GEO satellite communication apparatus 300. The satellite reception unit 620 performs reception processing on the data transmission signal received by the antenna station 610 to obtain observation data. The data transmission unit 630 transmits the observation data obtained by the satellite reception unit 620 from the communication unit 640 to the base station 7.

Note that, in a case where the transmission of the observation data from the GEO satellite communication unit 242 has not ended by the end time indicated by the time section notification of which has been given from the determination unit 262, the instruction unit 263 of the LEO satellite communication apparatus 200 instructs the writing unit 264 to write the observation data. The writing unit 264 accumulates untransmitted observation data in the data storage unit 270. After the processing of step S207, the LEO satellite communication apparatus 200 repeats the processing from step S201.

In step S206, when determining that the transmission of the observation data to the GEO satellite 3 is not permitted (step S206: NO), the determination unit 262 of the LEO satellite communication apparatus 200 instructs the writing unit 264 to accumulate the observation data. The writing unit 264 writes the observation data acquired in step S201 in the data storage unit 270 (step S208). The LEO satellite communication apparatus 200 performs the processing from step S201.

Note that, in step S207, in a case where there is no observation data to be transmitted, or in a case where the end of the transmission of the observation data before the end time indicated by the time section received from the determination unit 262 is detected, the instruction unit 263 of the LEO satellite communication apparatus 200 may notify the GEO satellite 3 of the end of the data transmission. Upon receiving the end of the data transmission, the control unit 340 of the GEO satellite communication apparatus 300 mounted on the GEO satellite 3 transmits a transmission inquiry from the LEO satellite communication unit 322 to each LEO satellite 2. Upon receiving the transmission inquiry, the control unit 260 of the LEO satellite communication apparatus 200 mounted on each LEO satellite 2 returns a transmission inquiry response in which the amount of data stored in the data storage unit 270 is set to the GEO satellite 3 in a case where transmission of observation data to the GWL 5 and the GEO satellite 3 is currently impossible. The LEO satellite communication apparatus 200 capable of transmitting observation data to the GWL 5 or the GEO satellite 3 returns, to the GEO satellite 3, a transmission inquiry response for which no data or no relay required is set. The control unit 340 of the GEO satellite communication apparatus 300 mounted on the GEO satellite 3 selects the LEO satellite 2 having the largest amount of data set in the transmission inquiry response from each LEO satellite 2, and permits the selected LEO satellite 2 to transmit the observation data. The control unit 340 returns a transmission permission to the LEO satellite 2 to be permitted to transmit the observation data. In a case where the LEO satellite communication apparatus 200 of the LEO satellite 2 receives the transmission permission from the GEO satellite 3, the processing from step S207 is performed with the GEO satellite 3 which is the transmission source of the transmission permission as the transmission destination of the observation data.

In addition, the LEO satellite communication unit 232 of the LEO satellite communication apparatus 200 may transmit the communication information such as the earth station communication information and the satellite communication information acquired from the earth station uplink signal by the earth station communication unit 222 to another LEO satellite communication apparatus 200. The LEO satellite communication unit 232 of the LEO satellite communication apparatus 200 may transmit the earth station communication information and the satellite communication information received from another LEO satellite communication apparatus 200 to yet another LEO satellite communication apparatus 200.

In the above description, the GWL 5 includes the information generation unit 520 that generates the communication information, but the control unit 260 of the LEO satellite communication apparatus 200 may include the information generation unit 520. In this case, the LEO satellite communication apparatus 200 receives information for generating communication information from the earth station. The control unit 260 of each LEO satellite communication apparatus 200 may generate the communication information of the LEO satellite 2 on which the own apparatus is mounted. Alternatively, some LEO satellite communication apparatuses 200 may generate the communication information of each of the LEO satellite 2 on which the own apparatuses are mounted and another LEO satellite 2. The LEO satellite communication apparatus 200 transmits communication information of another LEO satellite 2 from the LEO satellite communication unit 232 to another LEO satellite 2.

In addition, the base station 7 may have the function of the information generation unit 520. The satellite transmission unit 530 of the GWL 5 receives the communication information generated by the base station 7 and transmits the received communication information to the LEO satellite 2 using the earth station uplink signal. Alternatively, the base station 7 transmits the communication information generated by the base station 7 to the LEO satellite 2 via the GWG 6 and the GEO satellite 3.

In addition, the control unit 340 of the GEO satellite communication apparatus 300 may include the information generation unit 520, and the GWG 6 may have the function of the information generation unit 520. In a case where the GWG 6 includes the information generation unit 520, the satellite transmission unit 650 transmits the generated communication information to the GEO satellite 3 using the earth station uplink signal. The LEO satellite communication unit 322 of the GEO satellite communication apparatus 300 mounted on the GEO satellite 3 transmits the communication information generated by the control unit 340 or the communication information received by the earth station communication unit 312 from the GWG 6 to the LEO satellite 2. In addition, the GEO satellite communication unit 332 of the GEO satellite communication apparatus 300 may transmit the communication information to another GEO satellite 3. The GEO satellite communication apparatus 300 may transmit the communication information received by the GEO satellite communication unit 332 from another GEO satellite 3 from the LEO satellite communication unit 322 to the LEO satellite 2, or may transmit the communication information from the GEO satellite communication unit 332 to yet another GEO satellite 3.

According to the present embodiment, even in a case where the antenna of the earth station is insufficient, the LEO satellite can increase the capacity of the feeder link network and efficiently deploy the feeder link by using the link to the GEO satellite.

Second Embodiment

In the second embodiment, a LEO satellite located in an uncommunicable area with an earth station communicates with the earth station using a bypass via another LEO satellite. In the second embodiment, differences from the first embodiment will be mainly described.

Figure 10:
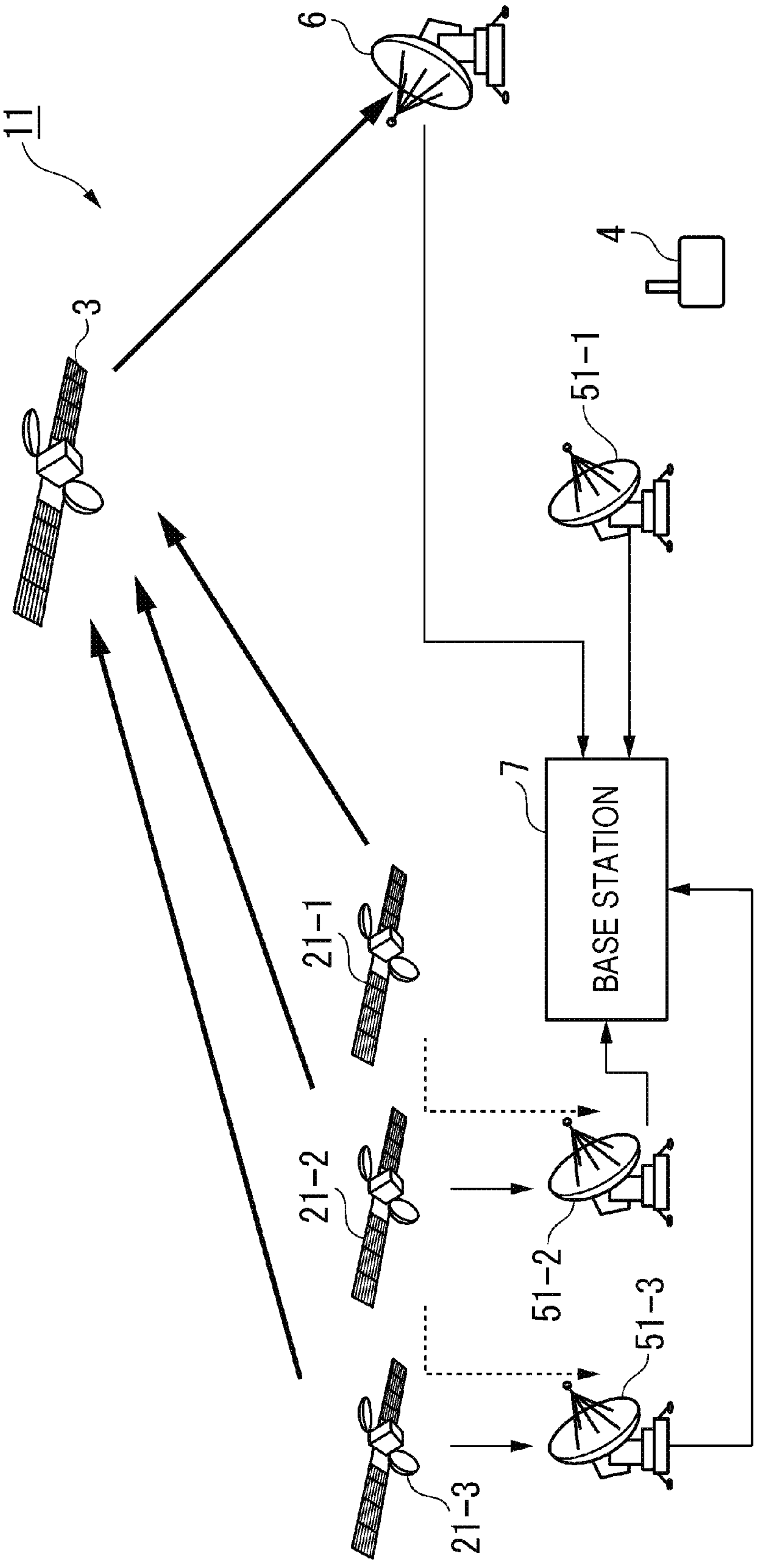
FIG. 10 is a diagram for describing a wireless communication system according to a second embodiment.

FIG. 10 is a diagram for describing an outline of a wireless communication system 11 according to a second embodiment. The wireless communication system 11 includes a LEO satellite 21, a GEO satellite 3, a terminal station 4, a GWL 51, a GWG 6, and a base station 7. The wireless communication system 11 illustrated in FIG. 10 is different from the wireless communication system 1 illustrated in FIG. 1 in that the LEO satellite 21 is provided instead of the LEO satellite 2 and the GWL 51 is provided instead of the GWL 5. Note that the wireless communication system 11 may not include the GEO satellite 3 and the GWG 6. The wireless communication system 11 includes a plurality of LEO satellites 21. N (N is an integer of 2 or more) LEO satellites 21 will be referred to as LEO satellites 21-1 to 21-N, respectively, and M (M is an integer of 1 or more) GWLs 51 will be referred to as GWLs 51-1 to 51-M, respectively. FIG. 10 illustrates an example in which N=3 and M=3.

The LEO satellite 21 that cannot communicate with the GWL 51 forms an inter-satellite link with a LEO satellite 21 that is as close as possible to the own satellite and can relay data among other LEO satellites 21 that can communicate with the GWL 51. The LEO satellite 21 performs alternative transmission by transmitting observation data transmitted via a feeder link to another LEO satellite 21. Note that each LEO satellite 21 notifies an earth station via the GEO satellite 3 as to whether data received from another LEO satellite 21 can be relayed.

Figure 11:
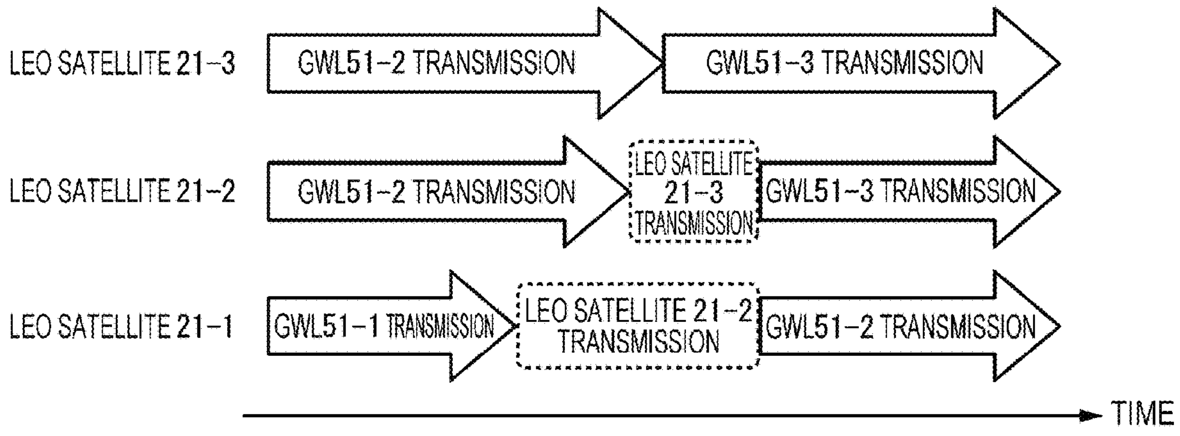
FIG. 11 is a diagram illustrating a communication destination of a LEO satellite according to the embodiment.

FIG. 11 is a diagram illustrating a communication destination of the LEO satellite 21. FIG. 11 illustrates communication destinations of the LEO satellites 21-1 to 21-3. The LEO satellite 21-1 transmits observation data to the LEO satellite 21-2 at a time when communication with any of the GWLs 51 is not possible. The LEO satellite 21-2 transmits the observation data acquired by itself and the observation data received from the LEO satellite 21-1 to the GWL 51-2.

However, there is also a time zone during which the LEO satellite 21-2 cannot communicate with the GWL 51. In that time zone, the LEO satellite 21-2 forms an inter-satellite link with the adjacent LEO satellite 21-3, and transmits the observation data acquired by the own apparatus and the observation data received from the LEO satellite 21-1 to the LEO satellite 21-3. The LEO satellite 21-3 transmits the observation data acquired by itself and the observation data received from the LEO satellite 21-2 to the GWL 51.

In this manner, the observation data transmitted by the LEO satellite 21-1 is relayed from the LEO satellite 21-2 to the LEO satellite 21-3 and transmitted to the GWL 51-2 or the GWL 51-3. As a result, the LEO satellite 21-1 can continue feeder link transmission.

Figure 12:
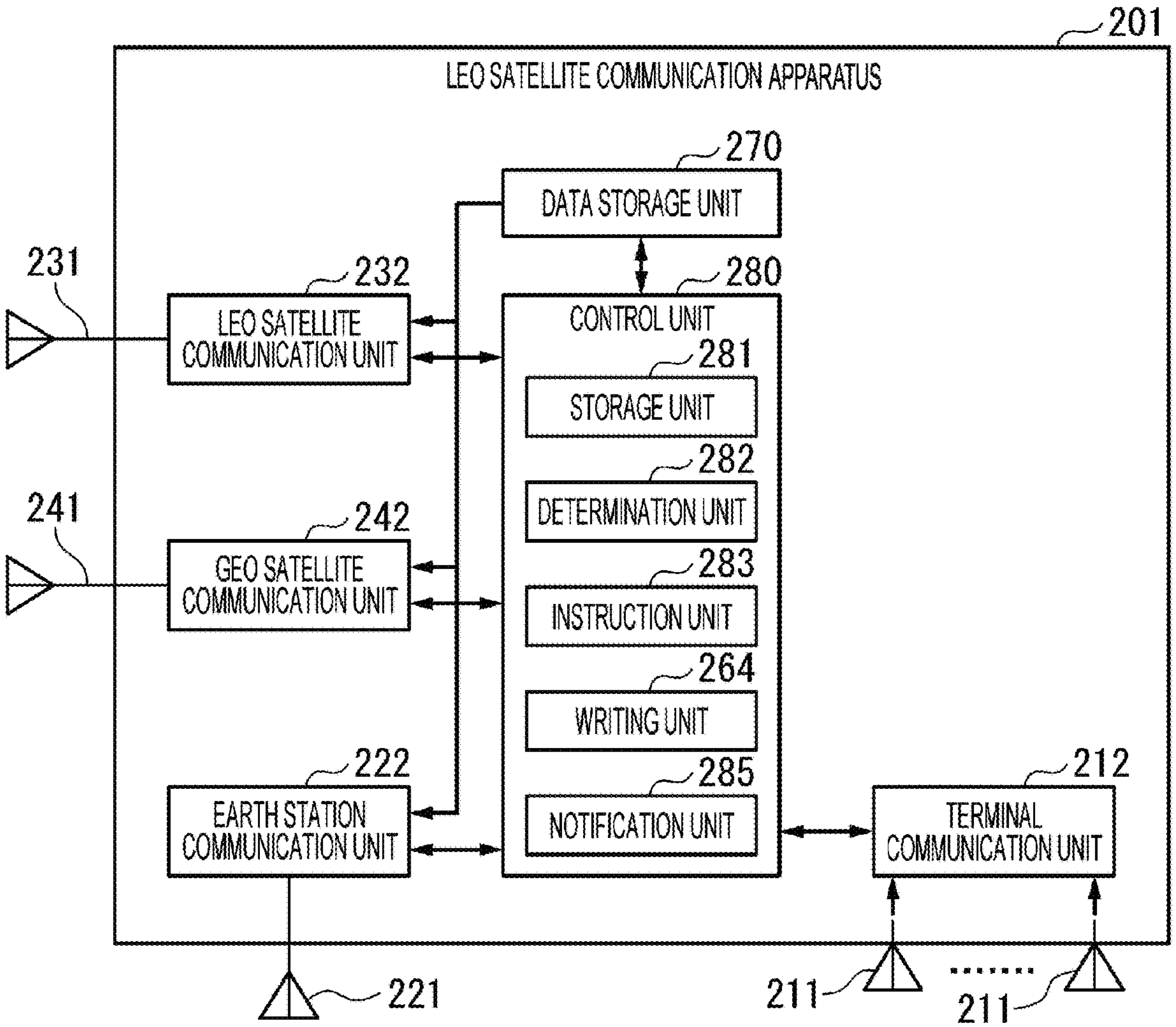
FIG. 12 is a block diagram illustrating a configuration of a LEO satellite communication apparatus according to the embodiment.

FIG. 12 is a block diagram illustrating a configuration of a LEO satellite communication apparatus 201 included in the LEO satellite 21 of the second embodiment. In FIG. 12, only functional blocks related to the present embodiment are extracted and illustrated. The LEO satellite communication apparatus 201 illustrated in FIG. 12 is different from the LEO satellite communication apparatus 200 of the first embodiment illustrated in FIG. 3 in that a control unit 280 is provided instead of the control unit 260.

The control unit 280 includes a storage unit 281, a determination unit 282, an instruction unit 283, a writing unit 264, and a notification unit 285. The storage unit 281 stores the routing information as the communication information. The routing information indicates a route of data transmission for each time section of the LEO satellite 21. The route include a route for transmitting data directly from the LEO satellite 21 to the GWL 51, and a route for transmitting data from the LEO satellite 21 to the GWL 51 via one or more other satellites. The satellite to pass through is another LEO satellite 21, but may include a GEO satellite 3. When data is transmitted from the LEO satellite 21 to the GWL 51 via another satellite, only the next satellite to be the data transmission destination of each LEO satellite 21 on the route may be set as the route in the routing information. In addition, area information may be used instead of the information of the time section.

The determination unit 282 reads the information of the route associated with the time section including the current time from the routing information. The determination unit 282 reads a GWL 51 or a satellite next to the own satellite on the route as a transmission destination from the read route information. The determination unit 282 notifies the instruction unit 283 of the read transmission destination. When the transmission destination cannot be obtained, the determination unit 282 instructs the writing unit 264 to accumulate the observation data.

When the transmission destination received from the determination unit 282 is the GWL 51, the instruction unit 283 outputs the observation data and the address of the transmission destination GWL 51 to an earth station communication unit 222. The earth station communication unit 222 generates an earth station downlink signal in which the address of the transmission destination GWL 51 is set as the destination and the observation data is set, and wirelessly transmits the generated earth station downlink signal through an antenna 221.

In a case where the transmission destination is another LEO satellite 21, the instruction unit 283 outputs the observation data and the address of the another LEO satellite 21, which is the transmission destination, to a LEO satellite communication unit 232. The LEO satellite communication unit 232 generates a data transmission signal in which the address of the another LEO satellite 21, which is the transmission destination, is set as the destination and the observation data is set, and wirelessly transmits the generated data transmission signal through an antenna 231.

In a case where the transmission destination is the GEO satellite 3, the instruction unit 283 outputs the observation data and the address of the transmission destination GEO satellite 3 to a GEO satellite communication unit 242. The GEO satellite communication unit 242 generates a data transmission signal in which the address of the transmission destination GEO satellite 3 is set as the destination and the observation data is set, and wirelessly transmits the generated data transmission signal through the antenna 241.

The notification unit 285 generates relay possible/impossible information for notifying whether data received from another LEO satellite 21 can be relayed. The notification unit 285 wirelessly transmits the generated relay possible/impossible information from the earth station communication unit 222 to the GWL 51.

Alternatively, the notification unit 285 transmits the generated relay possible/impossible information from the GEO satellite communication unit 242 to the GEO satellite 3. The GEO satellite 3 transmits the received relay possible/impossible information to the GWG 6.

The configuration of the GWL 51 is similar to the configuration of the GWL 5 of the first embodiment illustrated in FIG. 5. However, the information generation unit 520 of the GWL 51 generates routing information illustrated in FIG. 13.

FIG. 13 is a diagram illustrating an example of routing information. The routing information is information in which satellite identification information for specifying the LEO satellite 21, a time section specified by the start time and the end time, and a route of data transmission in the time section are associated with each other. The routing information may include information of a time section in which communication with any of the GWLs 51 and another satellite is impossible. In this case, in the routing information, the route indicating NULL or transmission impossible is set in association with the time section.

Figure 14:
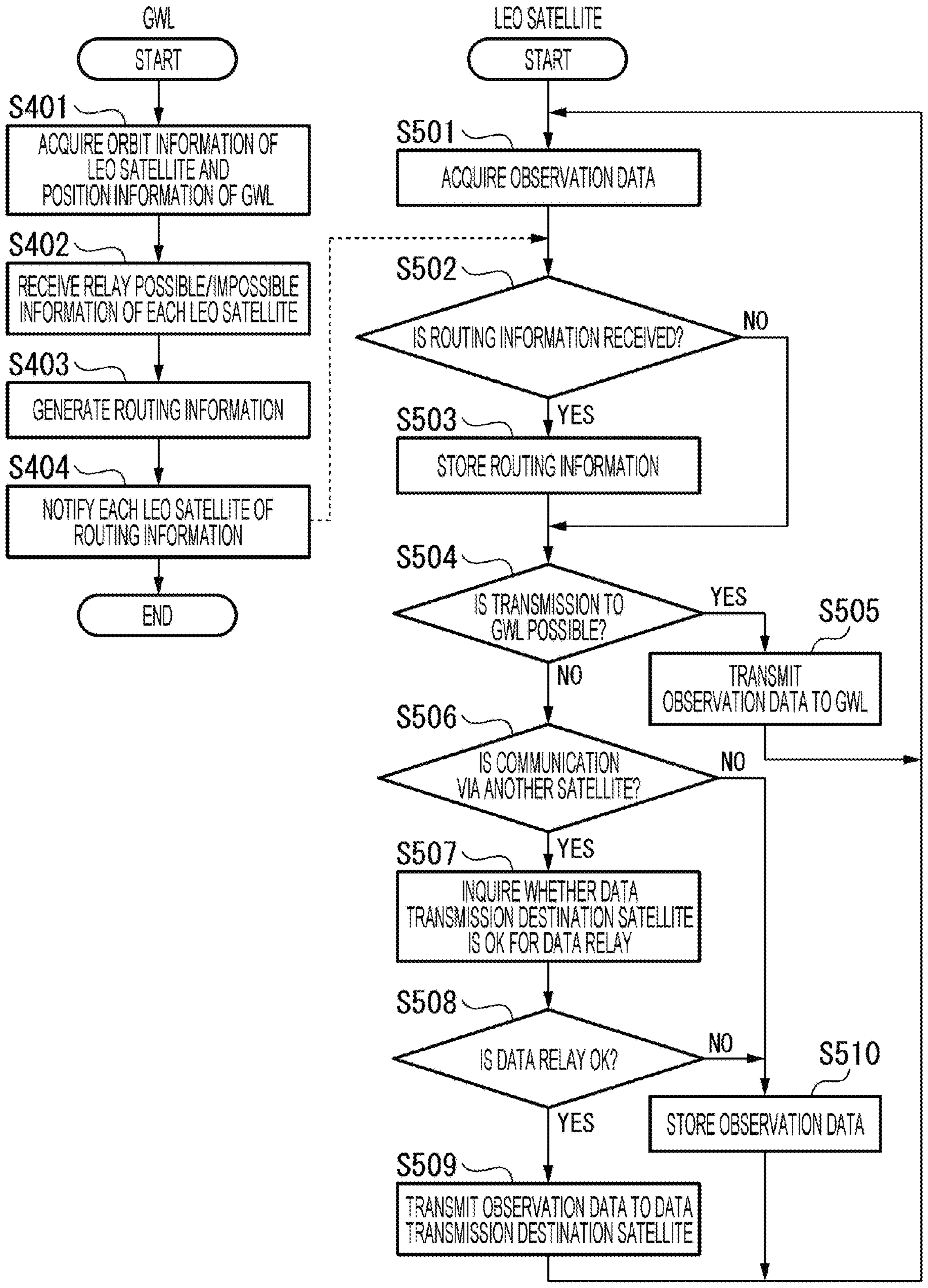
FIG. 14 is a flowchart illustrating processing of the wireless communication system according to the embodiment.

FIG. 14 is a processing flow illustrating operation of the wireless communication system 11.

First, the information generation unit 520 of the GWL 51 acquires LEO satellite orbit information indicating the orbit of each LEO satellite 21 and earth station position information indicating the position of each GWL 51 (step S401). The information generation unit 520 may further acquire GEO satellite orbit information indicating the orbit of each GEO satellite 3. The information generation unit 520 may acquire these pieces of information at predetermined timing such as periodically, or may acquire these pieces of information when an information acquisition instruction is input by an external apparatus or an input unit, which is not illustrated. In addition, the information generation unit 520 may receive these pieces of information from an external apparatus or may read them from a recording medium. These pieces of information may be input to the GWL 51 by an input unit, which is not illustrated.

The information generation unit 520 of the GWL 51 acquires relay possible/impossible information of each LEO satellite 21 (step S402). Specifically, the information generation unit 520 of the GWL 51 transmits a relay possible/impossible inquiry using an earth station uplink signal. Alternatively, the information generation unit 520 of the GWL 51 may request the GWG 6 to transmit the relay possible/impossible inquiry, and the GWG 6 may transmit the relay possible/impossible inquiry to the GEO satellite 3. The GEO satellite communication apparatus 300 of the GEO satellite 3 transmits the relay possible/impossible inquiry received from the GWG 6 to the LEO satellite 21.

When receiving the relay possible/impossible inquiry from the GWL 51 or the GEO satellite 3, the notification unit 285 of the LEO satellite communication apparatus 201 mounted on each LEO satellite 21 generates relay possible/impossible information indicating whether the own apparatus can relay data received from another LEO satellite 21. Note that the LEO satellite communication apparatus 201 may generate the relay possible/impossible information at a predetermined timing such as periodically. For example, the notification unit 285 determines that relay is possible when the amount of data accumulated in the data storage unit 270 is equal to or less than a threshold, and determines that relay is impossible when the amount of data exceeds the threshold. The relay possible/impossible information may be information indicating the amount of data accumulated in the data storage unit 270. The notification unit 285 adds the satellite identification information of the own satellite to the relay possible/impossible information. The notification unit 285 transmits the relay possible/impossible information from the earth station communication unit 222 to the GWL 51 using the earth station downlink signal.

Alternatively, the notification unit 285 transmits the relay possible/impossible information from the GEO satellite communication unit 242 to the GEO satellite 3. The GEO satellite communication apparatus 300 of the GEO satellite 3 transmits the relay possible/impossible information received from the LEO satellite communication apparatus 201 using the earth station downlink signal. The GWG 6 transmits relay possible/impossible information obtained from the received earth station downlink signal to the GWL 51 via the base station 7 or directly.

The information generation unit 520 of the GWL 51 determines the route of data transmission of each LEO satellite 21 in each time section on the basis of the time-series position of each LEO satellite 21 indicated by the LEO satellite orbit information, the position of each GWL 51 indicated by the earth station position information, the time-series position of each GEO satellite 3 indicated by the GEO satellite orbit information, and the relay possible/impossible information of each LEO satellite 21.

In a case where the LEO satellite 21 can directly communicate with the GWL 51, the information generation unit 520 determines a route for direct transmission from the LEO satellite 21 to the GWL 51. In a case where the LEO satellite 21 cannot directly communicate with the GWL 51, the information generation unit 520 determines a route for transmitting data to the GWL 51 via one or more other relayable LEO satellites 21. The information generation unit 520 obtains information of the relayable LEO satellite 21 on the basis of the satellite identification information added to the relay possible/impossible information indicating that relay is possible. In addition, in a case where the GEO satellite 3 is available, a route including the GEO satellite 3 may be used. The information generation unit 520 generates routing information indicating a route of each LEO satellite 21 for each time section (step S403).

The information generation unit 520 outputs the generated routing information to the satellite transmission unit 530. The satellite transmission unit 530 generates an earth station uplink signal in which the routing information is set. The satellite transmission unit 530 transmits the earth station uplink signal from the antenna station 510 at a timing at which communication with the LEO satellite 21 is possible (step S404). The information generation unit 520 may transmit the routing information via the GEO satellite 3. That is, the information generation unit 520 transmits the routing information to the GWG 6. The GWG 6 transmits the received routing information to the GEO satellite 3 using the earth station uplink signal. The GEO satellite communication apparatus 300 of the GEO satellite 3 stores the routing information received from the GWG 6 and transmits the routing information to the LEO satellite 21.

The LEO satellite communication apparatus 201 acquires observation data as in step S201 of FIG. 9 (step S501). When the LEO satellite communication apparatus 201 receives the routing information transmitted by the GWL 51 in step S404 from the GWL 51 or via the GEO satellite 3 (step S502: YES), the received routing information is stored in the storage unit 281 (step S503). After the processing of step S503 or when the routing information is not received (step S502: NO), the LEO satellite communication apparatus 201 performs processing of step S504.

The determination unit 282 reads information of the time section including the current time and the route associated with the time section from the routing information stored in the storage unit 281. The determination unit 282 reads information of the data transmission destination of the own satellite from the read route information. The determination unit 282 determines whether the observation data can be transmitted to the GWL 51 on the basis of the read data transmission destination information (step S504).

That is, when the data transmission destination is the GWL 51, the determination unit 282 determines that the observation data can be transmitted to the GWL 51. Alternatively, the determination unit 282 may determine whether the observation data can be transmitted to the GWL 51, similarly to the processing of step S204 of the first embodiment. Specifically, the determination unit 282 may transmit a transmission permission inquiry to the GWL 51. The determination unit 282 of the LEO satellite communication apparatus 201 determines whether transmission of observation data to the GWL 51 is possible according to a transmission permission inquiry response returned from the GWL 51. In addition, the determination unit 282 may determine whether the observation data can be transmitted to the GWL 51 depending on whether congestion occurs between the own satellite and the data transmission destination GWL 51. That is, in a case where congestion does not occur in communication with the GWL 51 in the earth station communication unit 222, the determination unit 282 determines that the observation data can be transmitted, and in a case where congestion occurs, the determination unit 282 determines that the observation data cannot be transmitted. Alternatively, the determination unit 282 may determine that the observation data can be transmitted to the GWL 51 when the reception quality of the earth station uplink signal from the GWL 51 in the earth station communication unit 222 is better than a predetermined value, and may determine that the observation data cannot be transmitted to the GWL 51 when the reception quality is equal to or less than the predetermined value.

When the determination unit 282 determines that the observation data can be transmitted to the GWL 51 (step S504: YES), the determination unit 282 outputs the data transmission destination to the instruction unit 283. The instruction unit 283 wirelessly transmits the data transmission signal of the earth station downlink signal in which the observation data is set to the GWL 51 indicated by the data transmission destination by processing similar to step S205 in FIG. 9 (step S505). After the processing of step S505, the LEO satellite communication apparatus 201 repeats the processing from step S501.

When determining that the observation data cannot be transmitted to the GWL 51 (step S504: NO), the determination unit 282 determines whether the communication is via another satellite (step S506). In a case where the data transmission destination is another satellite, the determination unit 282 determines that the communication is via another satellite (step S506: YES), and inquires of the data transmission destination satellite as to whether data relay is possible (step S507).

That is, when the data transmission destination is another LEO satellite 21, the determination unit 282 transmits a data relay inquiry from the LEO satellite communication unit 232 to another LEO satellite 21 (hereinafter, described as a relay LEO satellite 21), which is the data transmission destination. When receiving the data relay inquiry, the notification unit 285 of the LEO satellite communication apparatus 201 mounted on the relay LEO satellite 21 determines whether data can be relayed on the own satellite. For example, the notification unit 285 determines that relay is possible when the amount of data accumulated in the data storage unit 270 is equal to or less than a threshold, and determines that relay is impossible when the amount of data exceeds the threshold. The notification unit 285 returns a data relay inquiry response in which a determination result as to whether relay is possible is set to the LEO satellite 21, which is the transmission source of the data relay inquiry.

Alternatively, in a case where the data transmission destination is the GEO satellite 3, the determination unit 282 transmits the data relay inquiry from the GEO satellite communication unit 242 to the GEO satellite 3. Upon receiving the data relay inquiry, the control unit 340 of the GEO satellite communication apparatus 300 mounted on the GEO satellite 3 determines whether it is possible to relay the data received from the LEO satellite 21 in the own apparatus, and returns a data relay inquiry response in which the determination result is set to the LEO satellite 21.

The determination unit 282 of the LEO satellite communication apparatus 201 receives the data relay inquiry response transmitted from the relay LEO satellite 21 or the GEO satellite 3. When the determination unit 282 determines that relay possible is set in the data relay inquiry response (step S508: YES), the determination unit 282 outputs the data transmission destination to the instruction unit 283. The instruction unit 283 transmits a data transmission signal in which the observation data is set to the satellite of the data transmission destination (step S509).

Specifically, in a case where the data transmission destination is the relay LEO satellite 21, the instruction unit 283 outputs the observation data acquired in step S201 and the address of the relay LEO satellite 21 indicated by the data transmission destination to the LEO satellite communication unit 232, and instructs transmission. In addition, in a case where untransmitted observation data is stored in the data storage unit 270, the instruction unit 283 reads the observation data and outputs the read observation data to the LEO satellite communication unit 232. The LEO satellite communication unit 232 wirelessly transmits a data transmission signal in which the address of the relay LEO satellite 21 is set as the destination and the observation data is set through the antenna 231. In addition, in a case where the data transmission destination is the GEO satellite 3, the instruction unit 283 wirelessly transmits the data transmission signal in which the observation data is set to the GEO satellite 3 by processing similar to step S207 in FIG. 9.

When the route information cannot be read from the routing information (step S506: NO) or when relay impossible is set in the data relay inquiry response (step S508: NO), the determination unit 282 of the LEO satellite communication apparatus 201 determines that data transmission via another satellite is impossible. The determination unit 282 instructs the writing unit 264 to accumulate the observation data. The writing unit 264 writes the observation data acquired in step S501 in the data storage unit 270 (step S510). The LEO satellite communication apparatus 201 performs the processing from step S501.

Note that the LEO satellite communication apparatus 201 may omit the processing of steps S507 and S508.

When the LEO satellite communication apparatus 201 of the relay LEO satellite 21 receives the data transmission signal transmitted by the LEO satellite communication unit 232 from another LEO satellite communication apparatus 201 in step S509, the operation described below is performed. That is, in step S501, in addition to the observation data acquired from the terminal uplink signal and the observation data acquired from the sensor included in the relay LEO satellite 21, the LEO satellite communication apparatus 201 also regards the received data transmission signal as acquired observation data and performs the processing of FIG. 14. Then, in step S505, the instruction unit 283 further instructs the LEO satellite communication unit 232 to output the data transmission signal received from another LEO satellite communication apparatus 201 to the earth station communication unit 222. The earth station communication unit 222 transmits the data transmission signal input from the LEO satellite communication unit 232 using the earth station downlink signal.

In addition, in step S509, the instruction unit 283 further instructs the LEO satellite communication unit 232 to relay the received data transmission signal to the data transmission destination when the data transmission destination is the LEO satellite 21. The LEO satellite communication unit 232 relays the data transmission signal received from another LEO satellite 21 to yet another LEO satellite 21 as a data transmission destination. In addition, in step S509, the instruction unit 283 further instructs the LEO satellite communication unit 232 to output the received data transmission signal to the GEO satellite communication unit 242 when the data transmission destination is the GEO satellite 3. The GEO satellite communication unit 242 transmits the data transmission signal input from the LEO satellite communication unit 232 to the GEO satellite 3 using a radio signal.

Upon receiving the data transmission signal from the LEO satellite 21 or another GEO satellite 3, the GEO satellite 3 transmits the received data transmission signal to the relay LEO satellite 21, which is the data transmission destination, or yet another GEO satellite 3 on the basis of the routing information.

Third Embodiment

In the third embodiment, in a case where a LEO satellite located in an uncommunicable area with a GWL acquires observation data with high priority, the LEO satellite transmits the observation data to an earth station using a bypass through another LEO satellite or a GEO satellite. The observation data with high priority is, for example, observation data transmitted from a terminal station with high priority (premium user terminal: PUT) among terminal stations using a wireless communication system. In the third embodiment, differences from the second embodiment will be mainly described.

Figure 15:
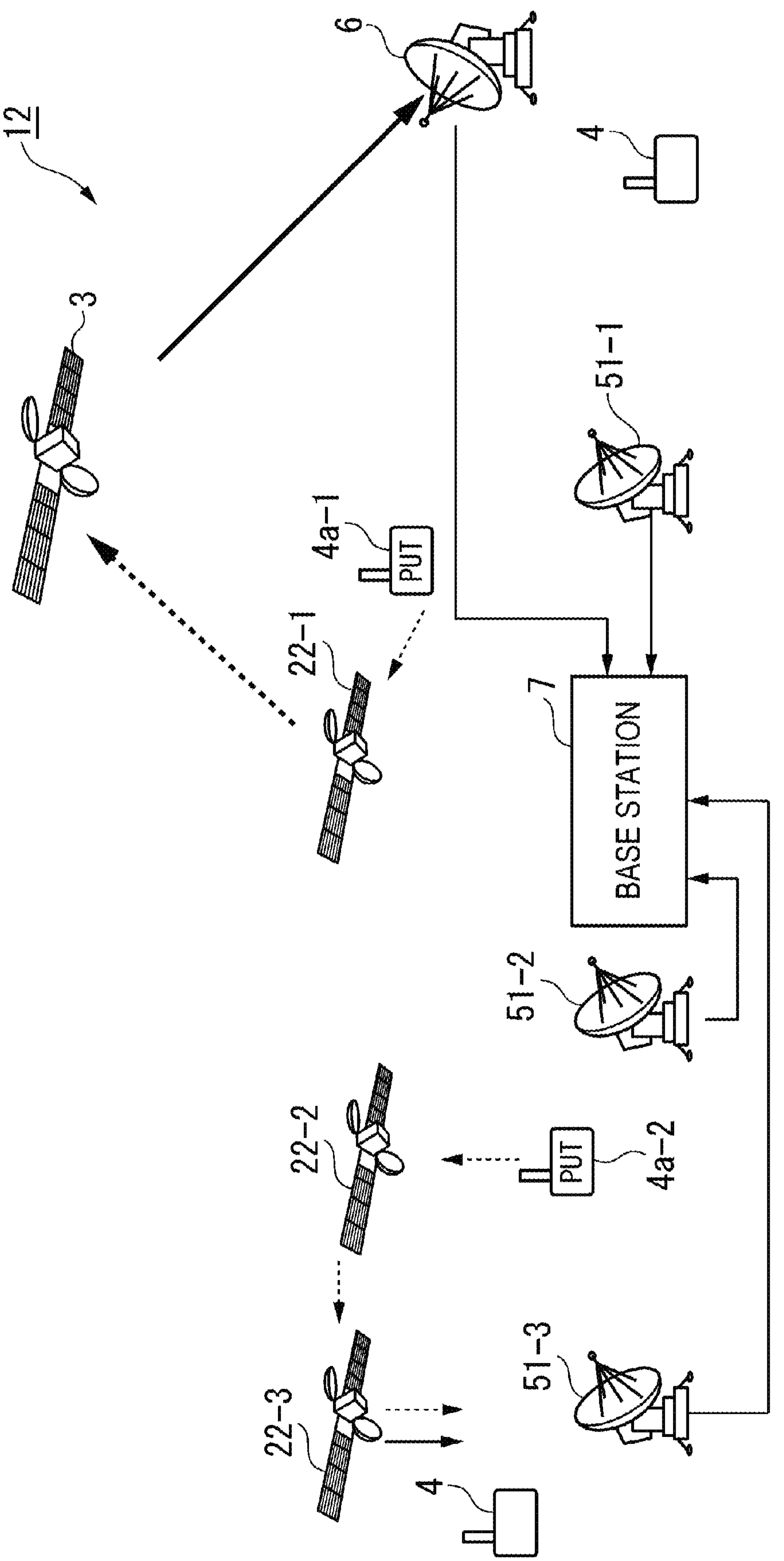
FIG. 15 is a diagram for describing a wireless communication system according to a third embodiment.

FIG. 15 is a diagram for describing an outline of a wireless communication system 12 according to the third embodiment. The wireless communication system 12 includes a LEO satellite 22, a GEO satellite 3, a terminal station 4, a GWL 51, a GWG 6, and a base station 7. The wireless communication system 12 illustrated in FIG. 15 is different from the wireless communication system 11 of the second embodiment illustrated in FIG. 10 in that the LEO satellite 22 is provided instead of the LEO satellite 21. Note that the wireless communication system 12 may not include the GEO satellite 3 and the GWG 6. The wireless communication system 12 includes a plurality of LEO satellites 22. N (N is an integer of 2 or more) LEO satellites 22 are described as LEO satellites 22-1 to 22-N. FIG. 15 illustrates an example in which N=3. In addition, some of the terminal stations 4 are PUTs. The PUT terminal station 4 is referred to as a PUT 4*a*. In FIG. 15, two PUTs 4*a* are referred to as PUT 4*a*-1 and PUT 4*a*-2.

In a case where the LEO satellite 22 receives observation data from the terminal station 4 having a normal priority in a time zone in which the own satellite cannot communicate with the GWL 51, the observation data is stored and transmitted at a timing in which communication with the GWL 51 is possible. However, when the LEO satellite 22 receives observation data from PUT 4*a* in a time zone in which the own satellite cannot communicate with the GWL 51, the earth station is immediately notified by a bypass via another adjacent LEO satellite 22 or GEO satellite 3 in consideration of immediacy.

Figure 16:
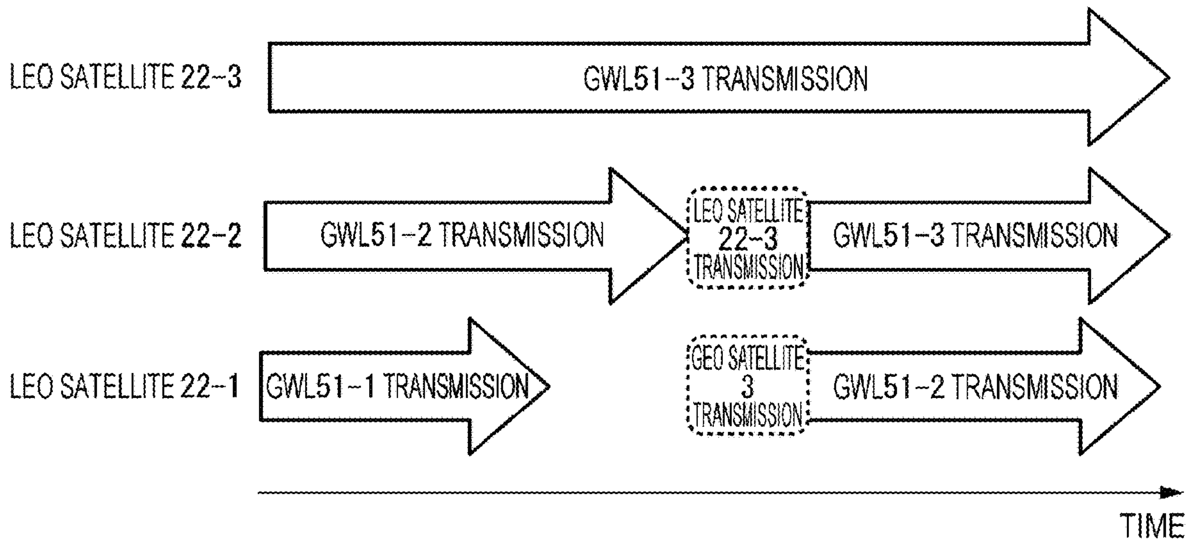
FIG. 16 is a diagram illustrating a communication destination of a LEO satellite according to the embodiment.

FIG. 16 is a diagram illustrating a communication destination of the LEO satellite 22. FIG. 16 illustrates communication destinations of the LEO satellites 22-1 to 22-3. There is a time during which the LEO satellite 22-1 and the LEO satellite 22 cannot communicate with any of the GWLs 51. In a case where the LEO satellite 22-1 receives observation data from the PUT 4*a*-1 during a time when communication with the GWL 51 cannot be performed, the LEO satellite 22-1 transmits the observation data received from the PUT 4*a*-1 to the GEO satellite 3. The GEO satellite 3 transmits the observation data received from the LEO satellite 22-1 to the GWG 6.

On the other hand, in a case where the LEO satellite 22-2 receives observation data from the PUT 4*a*-2 during a time in which communication with any of the GWLs 51 cannot be performed, the observation data is transmitted to the adjacent LEO satellite 22-3. The LEO satellite 22-3 transmits the observation data acquired by the own satellite and the observation data received from the LEO satellite 22-2 to the GWL 51-3.

Figure 17:
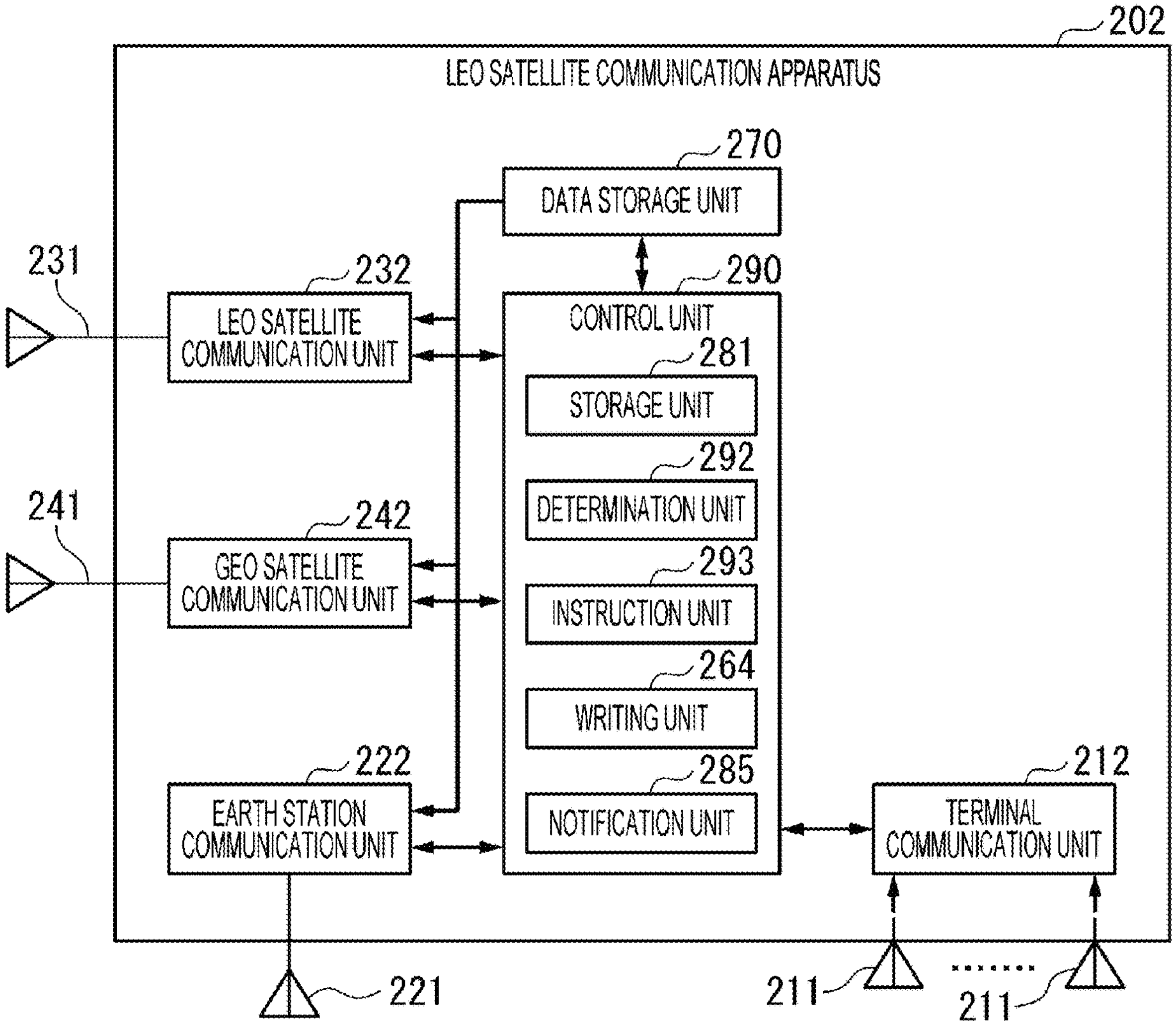
FIG. 17 is a block diagram illustrating a configuration of a LEO satellite communication apparatus according to the embodiment.

FIG. 17 is a block diagram illustrating a configuration of a LEO satellite communication apparatus 202 included in the LEO satellite 22 of the third embodiment. In FIG. 17, only functional blocks related to the present embodiment are extracted and illustrated. The LEO satellite communication apparatus 202 illustrated in FIG. 17 is different from the LEO satellite communication apparatus 201 of the second embodiment illustrated in FIG. 12 in that a control unit 290 is provided instead of the control unit 280.

The control unit 290 is different from the control unit 280 of the second embodiment in that a determination unit 292 is provided instead of the determination unit 282 and an instruction unit 293 is provided instead of the instruction unit 283.

The determination unit 292 reads the information of the route associated with the time section including the current time from the routing information stored in the storage unit 281. When the next transmission destination of the own satellite in the read route is a GWL 51, the determination unit 292 notifies the instruction unit 293 of the transmission destination GWL 51.

When the next transmission destination of the own satellite in the read route is a satellite, that is, another LEO satellite 22 or the GEO satellite 3, the determination unit 292 determines whether observation data with high priority has been acquired. The observation data with high priority is the observation data received from the PUT 4*a*. Note that the observation data acquired by a predetermined sensor included in the LEO satellite 22 may be observation data with high priority. In a case where the determination unit 292 determines that observation data with high priority has been acquired, the determination unit 292 notifies the instruction unit 293 of the next transmission destination satellite. When determining that the acquired observation data does not have a high priority, the determination unit 292 instructs the writing unit 264 to accumulate the observation data.

When the transmission destination received from the determination unit 292 is the GWL 51, the instruction unit 293 outputs the observation data and the address of the transmission destination GWL 51 to an earth station communication unit 222 similarly to the processing of the instruction unit 283 of the second embodiment. The earth station communication unit 222 generates an earth station downlink signal in which the address of the transmission destination GWL 51 is set as the destination and the observation data is set, and wirelessly transmits the generated earth station downlink signal through an antenna 221.

In a case where the transmission destination is another LEO satellite 22, the instruction unit 293 outputs the observation data with high priority and the address of the another LEO satellite 22, which is the transmission destination, to a LEO satellite communication unit 232. The LEO satellite communication unit 232 generates a data transmission signal in which the address of the another LEO satellite 22, which is the transmission destination, is set as the destination and the observation data with high priority is set, and wirelessly transmits the generated data transmission signal through an antenna 231.

In a case where the transmission destination is the GEO satellite 3, the instruction unit 293 outputs the observation data with high priority and the address of the transmission destination GEO satellite 3 to a GEO satellite communication unit 242. The GEO satellite communication unit 242 generates a data transmission signal in which the address of the transmission destination GEO satellite 3 is set as the destination and the observation data with high priority is set, and wirelessly transmits the generated data transmission signal through an antenna 241.

Figure 18:
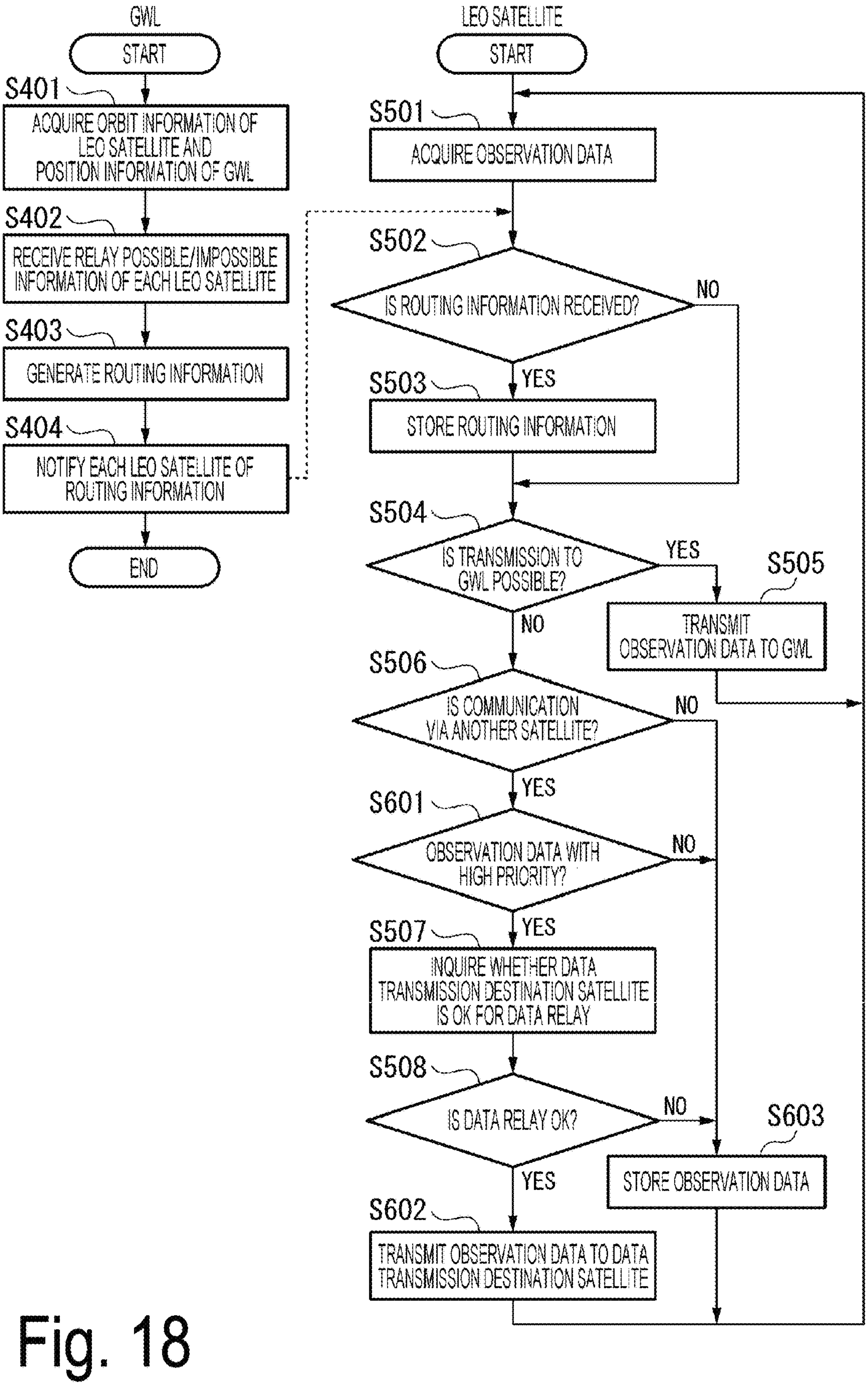
FIG. 18 is a flowchart illustrating processing of the wireless communication system according to the embodiment.

FIG. 18 is a processing flow illustrating operation of the wireless communication system 12. In FIG. 18, the same processing as the processing flow in the second embodiment in FIG. 14 will be denoted by the same reference signs, and detailed description thereof will be omitted.

The GWL 51 performs processing similar to steps S401 to S404 illustrated in FIG. 14, generates routing information, and transmits the routing information to the LEO satellite 22. Note that the GWL 51 may not execute the processing of step S402. In this case, the GWL 51 performs the processing of step S403 assuming that all the LEO satellites 22 are capable of relay, and generates routing information.

The LEO satellite communication apparatus 202 mounted on the LEO satellite 22 performs processing similar to steps S501 to S506 illustrated in FIG. 14. That is, the LEO satellite communication apparatus 202 acquires observation data (step S501). Upon receiving the routing information, the LEO satellite communication apparatus 202 stores the received routing information in the storage unit 281 (step S502, step S503). The determination unit 292 reads the time section including the current time and the information of the route associated with the time section from the routing information, and further reads the information of the data transmission destination of the own satellite from the read route information. When the determination unit 292 determines that the data transmission destination is the GWL 51 and the observation data can be transmitted to the GWL 51 (step S504: YES), the LEO satellite communication apparatus 202 wirelessly transmits the data transmission signal of the earth station downlink signal in which the observation data is set to the GWL 51 (step S505). On the other hand, when determining that the observation data cannot be transmitted to the GWL 51 (step S504: NO), the determination unit 292 determines whether the communication is via another satellite (step S506).

In a case where the data transmission destination is another satellite, the determination unit 292 determines that the communication is via another satellite (step S506: YES), and executes processing of step S601. That is, the determination unit 292 determines whether the observation data acquired in step S501 has a high priority (step S601).

For example, when the observation data is received from the PUT 4*a*, the determination unit 292 determines that the observation data is observation data with high priority. Specifically, the PUT 4*a* sets PUT information indicating that it is a PUT in the terminal uplink signal and transmits the terminal uplink signal. When the PUT information is set in the received terminal uplink signal, the terminal communication unit 212 of the LEO satellite communication apparatus 202 adds the PUT information to the observation data obtained from the terminal uplink signal, and outputs the observation data to the control unit 290. The determination unit 292 determines whether the observation data is received from the PUT 4*a* on the basis of whether the PUT information is added.

Alternatively, the storage unit 281 may store the terminal ID of the PUT 4*a* in advance. The terminal ID is information for specifying the terminal station 4. The terminal communication unit 212 adds the terminal ID set in the terminal uplink signal to the observation data acquired from the terminal uplink signal, and outputs the observation data to the control unit 290. The determination unit 292 determines whether the observation data is received from the PUT 4*a* on the basis of whether the terminal ID added to the observation data matches any terminal ID of the PUT 4*a* stored in the storage unit 281.

Note that when the observation data is the reception waveform of the terminal uplink signal, the PUT information and the terminal ID are set in the terminal uplink signal by using a spreading code or the like. As a result, the PUT information and the terminal ID can be read without performing demodulation. Note that the determination unit 292 may determine observation data obtained by a predetermined sensor included in the LEO satellite 22 as high priority. In addition, the determination unit 292 may determine a predetermined type of observation data as high priority. In this case, information of the type of data is added to the observation data.

When the determination unit 292 determines that the observation data acquired in step S501 has a high priority (step S601: YES), the LEO satellite communication apparatus 202 performs processing similar to steps S507 to S508 in FIG. 14. That is, the LEO satellite communication apparatus 202 inquires of the data transmission destination satellite as to whether data relay is possible (step S507). When the determination unit 292 determines that relay possible is set in the received data relay inquiry response corresponding to the inquiry (step S508: YES), the processing of step S602 is performed.

The determination unit 292 outputs the data transmission destination to the instruction unit 293. The instruction unit 293 transmits a data transmission signal in which the observation data with high priority is set to the data transmission destination satellite (step S602). Specifically, the instruction unit 293 reads observation data with high priority among pieces of untransmitted observation data stored in the data storage unit 270. Note that the instruction unit 293 may read all the pieces of untransmitted observation data stored in the data storage unit 270. The instruction unit 293 sets the observation data acquired in step S501 and the read observation data as bypass relay target observation data.

In a case where the data transmission destination is another LEO satellite 22, the instruction unit 293 outputs the bypass relay target observation data and the address of the another LEO satellite 22 indicated by the data transmission destination to the LEO satellite communication unit 232, and instructs transmission. The LEO satellite communication unit 232 wirelessly transmits a data transmission signal in which the address of the another LEO satellite 22, which is the transmission destination, received from the instruction unit 293 is set as the destination and the bypass relay target observation data is set through the antenna 231.

On the other hand, in a case where the data transmission destination is the GEO satellite 3, the instruction unit 293 outputs the bypass relay target observation data and the address of the GEO satellite 3 indicated by the data transmission destination to the GEO satellite communication unit 242, and instructs transmission. The GEO satellite communication unit 242 wirelessly transmits a data transmission signal in which the address of the GEO satellite 3 is set as the destination and the bypass relay target observation data is set through the antenna 241.

When the route information cannot be read from the routing information (step S506: NO), when it has been determined that the acquired observation data is not of high priority (step S601), or when relay impossible is set in the data relay inquiry response (step S508: NO), the determination unit 292 of the LEO satellite communication apparatus 202 determines that data transmission via another satellite is impossible. The determination unit 292 instructs the writing unit 264 to accumulate the observation data. The writing unit 264 writes the observation data acquired in step S501 in the data storage unit 270 (step S603). At this time, in a case where the observation data has a high priority, the writing unit 264 adds high priority information to the observation data and writes the observation data in the data storage unit 270. When the observation data includes information indicating high priority, the writing unit 264 may not add the high priority information.

The LEO satellite communication apparatus 202 mounted on the LEO satellite 22 of the data transmission destination that has received the data transmission signal transmitted in step S602 operates as descried below. That is, in step S501, in addition to the observation data acquired from the terminal uplink signal and the observation data acquired from the sensor included in the LEO satellite 22, the LEO satellite communication apparatus 202 also regards the received data transmission signal as acquired observation data and performs the processing of FIG. 18. Then, in step S505, the instruction unit 293 further instructs the LEO satellite communication unit 232 to output the data transmission signal received from another LEO satellite communication apparatus 202 to the earth station communication unit 222.

In addition, in step S601, the instruction unit 293 determines that the data transmission signal received from the another LEO satellite communication apparatus 202 is observation data with high priority.

In step S602, the instruction unit 293 instructs the LEO satellite communication unit 232 to relay the received data transmission signal to the data transmission destination when the data transmission destination is the LEO satellite 22. The LEO satellite communication unit 232 relays the data transmission signal received from another LEO satellite 22 to yet another LEO satellite 22 as a data transmission destination.

In addition, in step S602, the instruction unit 293 instructs the LEO satellite communication unit 232 to output the received data transmission signal to the GEO satellite communication unit 242 when the data transmission destination is the GEO satellite 3. The GEO satellite communication unit 242 transmits the data transmission signal input from the LEO satellite communication unit 232 to the GEO satellite 3 using a radio signal.

Upon receiving the data transmission signal from the LEO satellite 22 or another GEO satellite 3, the GEO satellite 3 transmits the received data transmission signal to the GWG 6, the data transmission destination LEO satellite 22, or yet another GEO satellite 3 on the basis of the routing information.

Note that, in a case where the bypass relay via the LEO satellite 22 is not performed, the communication system of the third embodiment can have a configuration similar to that of the wireless communication system 1 of the first embodiment. In this case, the wireless communication system 1 performs processing similar to the processing of the first embodiment illustrated in FIG. 9 except for the following. That is, in step S103 of FIG. 9, the information generation unit 520 of the GWL 5 selects all the LEOs 2 at the positions communicable with the same GEO satellite 3 in the uncommunicable time section as the LEOs 2 that are permitted to communicate with the GEO satellite 3, and generates the satellite communication information.

In addition, before the processing in step S206, the determination unit 262 of the LEO satellite communication apparatus 200 performs processing similar to that in step S601 described above, and determines whether the observation data received in step S201 is observation data with high priority. In a case where the determination unit 262 determines that the observation data is observation data with high priority, the processing of step S206 is performed. In a case where the determination unit 262 determines that the observation data is not observation data with high priority or in a case where NO is determined in step S206, the processing of step S603 is performed instead of the processing of step S208.

In addition, in step S207, the instruction unit 263 outputs the observation data acquired in step S201, the untransmitted observation data with high priority stored in the data storage unit 270, and the address of the GEO satellite 3 to the GEO satellite communication unit 242, and instructs transmission. Note that the instruction unit 263 may output all the pieces of untransmitted observation data stored in the data storage unit 270 to the GEO satellite communication unit 242.

Figure 19:
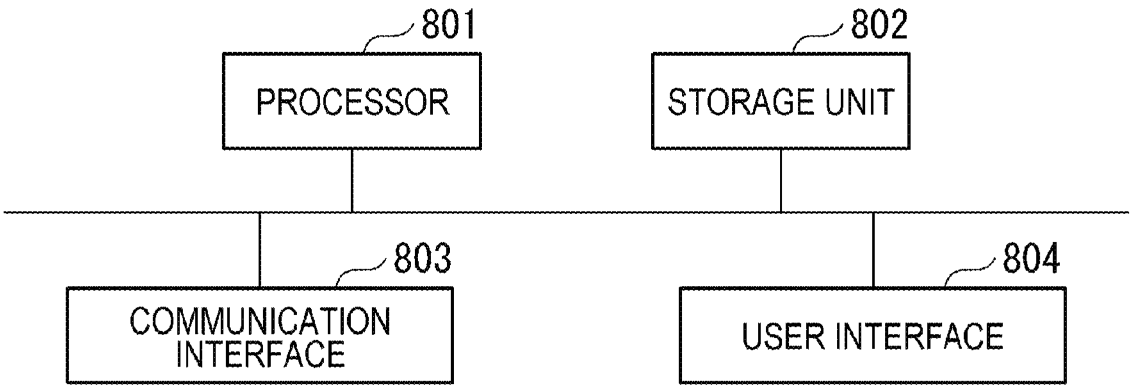
FIG. 19 is a hardware configuration diagram of the LEO satellite communication apparatuses according to the first to third embodiments.

A hardware configuration example of the LEO satellite communication apparatuses 200, 201, and 202 will be described. FIG. 19 is a apparatus configuration diagram illustrating a hardware configuration example of the LEO satellite communication apparatuses 200, 201, and 202. The LEO satellite communication apparatuses 200, 201, and 202 each include a processor 801, a storage unit 802, a communication interface 803, and a user interface 804.

The processor 801 is a central processing device that performs calculation and control. The processor 801 is, for example, a central processing unit (CPU). The storage unit 802 is a storage device such as various memories or a hard disk. The processor 801 reads a program from the storage unit 802 and executes the program, thereby implementing the control units 260, 280, and 290. Some of the functions of the control units 260, 280, and 290 may be implemented using hardware such as an application specific integrated circuit (ASIC), a programmable logic device (PLD), or a field programmable gate array (FPGA). The storage unit 802 further includes a work area and the like to be used when the processor 801 executes various programs. The communication interface 803 is communicatively connected with another device. The communication interface 803 corresponds to the terminal communication unit 212, the earth station communication unit 222, the LEO satellite communication unit 232, and the GEO satellite communication unit 242. The user interface 804 is an input device such as a keyboard, a pointing device (a mouse, a tablet, etc.), a button, or a touch panel, or a display device such as a display. Artificial operations are inputted through the user interface 804.

The hardware configurations of the GWLs 5 and 51 are the same as those in FIG. 19. The processor 801 reads a program from the storage unit 802 and executes the program, thereby implementing the information generation unit 520 and the data transmission unit 550. The communication interface 803 corresponds to the satellite transmission unit 530, the satellite reception unit 540, and the communication unit 560.

Note that, instead of the LEO satellite, another flying object flying above, such as a drone or a HAPS, may be used as a moving body on which the communication apparatus is mounted.

According to the above-described embodiments, the wireless communication system includes one or more first communication apparatuses that move, one or more second communication apparatuses that move, and one or more reception apparatuses. For example, the first communication apparatus is the LEO satellite communication apparatuses 200, 201, and 202 of the embodiments, the second communication apparatus is the LEO satellite communication apparatuses 200, 201, and 202 and the GEO satellite communication apparatus 300 of the embodiments, and the reception apparatus is the GWL 5 and the GWG 6.

The first communication apparatus includes a first communication unit, a second communication unit, and a first control unit. For example, the first communication unit is the earth station communication unit 222 of the embodiments, the second communication unit is the LEO satellite communication unit 232 and the GEO satellite communication unit 242 of the embodiments, and the first control unit is the control units 260, 280, and 290 of the embodiments. The first communication unit wirelessly communicates with the reception apparatus. The second communication unit wirelessly communicates with the second communication apparatus. The first control unit, when the own apparatus can communicate with any of the reception apparatuses, transmits transmission data acquired by the own apparatus from the first communication unit to the reception apparatus, and, when the own apparatus cannot communicate with any of the reception apparatuses, transmits the transmission data from the second communication unit to the second communication apparatus capable of communicating with the own apparatus.

The second communication apparatus includes a third communication unit, a fourth communication unit, and a second control unit. For example, the third communication unit is the LEO satellite communication units 232 and 322 of the embodiments, the fourth communication unit is the earth station communication units 222 and 312 of the embodiments, and the second control unit is the control units 260, 280, 290, and 340 of the embodiments. The third communication unit wirelessly communicates with the first communication apparatus. The fourth communication unit wirelessly communicates with the reception apparatus. The second control unit transmits the transmission data received by the third communication unit from the first communication apparatus from the fourth communication unit to a reception apparatus capable of communicating with the own apparatus.

The first control unit may transmit transmission data from the second communication unit to the second communication apparatus when the own apparatus cannot communicate with any of the reception apparatuses and the own apparatus is permitted to transmit data to the second communication apparatus. Among a plurality of first communication apparatuses, the first communication apparatus permitted to transmit data to the second communication apparatus may be selected on the basis of the length of the time section in which the first communication apparatus cannot communicate with any of the reception apparatuses.

The time section in which the first communication apparatus cannot communicate with any of the reception apparatuses may be calculated on the basis of the information of the time-series position of the first communication apparatus and the position of the reception apparatus.

The first communication apparatus may be included in a low earth orbit satellite, the second communication apparatus may be included in a geostationary satellite, and the reception apparatus may be installed on the earth. The transmission data is data wirelessly received by the first communication apparatus from a transmission apparatus installed on the earth. For example, the transmission apparatus is the terminal station 4 of the embodiments.

The third communication unit may wirelessly communicate with the first communication apparatus and another second communication apparatus. The second control unit of the second communication apparatus, when the own apparatus can communicate with a reception apparatus, transmits transmission data received by the third communication unit from the fourth communication unit to the reception apparatus, and, when the own apparatus cannot communicate with the reception apparatus, transmits the transmission data received by the third communication unit from the third communication unit to another second communication apparatus capable of communicating with the own apparatus.

The second control unit of the second communication apparatus, when the own apparatus can communicate with a reception apparatus, transmits the transmission data received by the third communication unit and the transmission data acquired by the own apparatus from the fourth communication unit to the reception apparatus, and, when the own apparatus cannot communicate with the reception apparatus, transmits the transmission data received by the third communication unit and the transmission data acquired by the own apparatus from the third communication unit to another second communication apparatus capable of communicating with the own apparatus.

The first communication apparatus and the second communication apparatus may be provided in a low earth orbit satellite, and the reception apparatus may be installed on the earth. The transmission data acquired by the first communication apparatus may be data wirelessly received by the first communication apparatus from a transmission apparatus installed on the earth, and the transmission data acquired by the second communication apparatus may be data wirelessly received by the second communication apparatus from a transmission apparatus installed on the earth. For example, the transmission apparatus is the terminal station 4 of the embodiments.

The first control unit of the first communication apparatus may determine whether the own apparatus can communicate with the reception apparatus at a predetermined time on the basis of a time section in which the own apparatus can communicate with the reception apparatus, the time section being calculated in advance on the basis of a time-series position of the first communication apparatus and a position of the reception apparatus.

The first control unit of the first communication apparatus may determine the second communication apparatus that can communicate with the own apparatus at a predetermined time on the basis of a time section in which the own apparatus can communicate with the second communication apparatus, the time section being calculated in advance on the basis of a time-series position of the first communication apparatus and a time-series position of the second communication apparatus.

The first control unit, when the own apparatus cannot communicate with any of the reception apparatuses and the acquired transmission data has a high priority, may transmit the transmission data from the second communication unit to the second communication apparatus and, when the own apparatus cannot communicate with any of the reception apparatuses and the acquired transmission data does not have a high priority, may transmit the transmission data from the first communication unit to the reception apparatus after the own apparatus becomes capable of communicating with any of the reception apparatuses. For example, the transmission data with high priority is data received from a transmission apparatus with high priority among a plurality of transmission apparatuses that transmits data.

As described above, the embodiments of the present invention have been described in detail with reference to the drawings; however, a specific configuration is not limited to the embodiments and includes design and the like within the scope not departing from the gist of the present invention.

REFERENCE SIGNS LIST

1, 11, 12 Wireless communication system
2-1 to 2-3, 21-1 to 21-3, 22-1 to 22-3 LEO satellite
3 GEO satellite
4 Terminal station
5, 5-1, 5-2, 51-1 to 51-3 GWL
6 GWG
7 Base station
200, 201, 202 LEO satellite communication apparatus
211, 221, 231, 241 Antenna
212 Terminal communication unit
222 Earth station communication unit
232 LEO satellite communication unit
242 GEO satellite communication unit
250 Data storage unit
260, 280, 290 Control unit
261, 281 Storage unit
262, 282, 292 Determination unit
263, 283, 293 Instruction unit
264 Writing unit
285 Notification unit
300 GEO satellite communication apparatus
311, 321, 331 Antenna
312 Earth station communication unit
322 LEO satellite communication unit
332 GEO satellite communication unit
340 Control unit
510, 610 Antenna station
520 Information generation unit
530, 650 Satellite transmission unit
540, 620 Satellite reception unit
550, 630 Data transmission unit
560, 640 Communication unit
801 Processor
802 Storage unit
803 Communication interface
804 User interface

The invention claimed is:

1. A wireless communication system comprising; one or more first communication apparatuses that move; one or more second communication apparatuses that move; and one or more reception apparatuses, wherein a first communication apparatus included in the one or more first communication apparatuses includes:

a first transceiver that wirelessly communicates with at least one of the reception apparatuses;

a second transceiver that wirelessly communicates with at least one of the second communication apparatuses; and a first controller that, when the first communication apparatus can communicate with the at least one of the reception apparatuses, transmits transmission data acquired by the first communication apparatus, using the first transceiver, to the at least one of the reception apparatuses capable of communicating with the first communication apparatus, wherein the first controller when the first communication apparatus cannot communicate with the at least one of the reception apparatuses, transmits the transmission data, using the second transceiver to the at least one of the second communication apparatuses capable of communicating with the first communication apparatus, and wherein a second communication apparatus included in the at least one of the one or more second communication apparatuses includes:

a third transceiver that wirelessly communicates with the first communication apparatus;

a fourth transceiver that wirelessly communicates with the at least one of the reception apparatuses; and a second controller that transmits the transmission data received by the third transceiver from the first communication apparatus, using the fourth transceiver, to the at least one of the reception apparatuses capable of communicating with the second communication apparatus, wherein the first controller, when the first communication apparatus cannot communicate with the at least one of the reception apparatuses and the acquired transmission data has a high priority, transmits the transmission data, using the second transceiver, to the at least one of the second communication apparatuses capable of communicating with the first communication apparatus, and wherein the first controller, when the first communication apparatus cannot communicate with the at least one of the reception apparatuses and the acquired transmission data does not have the high priority, transmits, after the first communication apparatus becomes capable of communicating with the at least one of the reception apparatuses, the transmission data, using the first transceiver, to the at least one of the reception apparatuses capable of communicating with the first communication apparatus.

2. The wireless communication system according to claim 1, wherein the first controller, when the first communication apparatus cannot communicate with the at least one of the reception apparatuses and the first communication apparatus is permitted to transmit data to the one or more second communication apparatuses, transmits the transmission data, using the second transceiver, to the at least one of the second communication apparatuses capable of communicating with the first communication apparatus, and the one or more first communication apparatuses permitted to transmit data to the one or more second communication apparatuses are determined on a basis of a length of a time section in which each of the first communication apparatuses cannot communicate with the at least one of the reception apparatuses.

3. The wireless communication system according to claim 2, wherein the time section in which each of the first communication apparatuses cannot communicate with the at least one of the reception apparatuses is calculated on a basis of information of a time-series position of each of the first communication apparatuses and a position of each of the reception apparatuses.

4. The wireless communication system according to claim 2, wherein the one or more first communication apparatuses are provided in a low earth orbit satellite, the one or more second communication apparatuses are provided in a geostationary satellite, and the one or more reception apparatuses are installed on earth.

5. The wireless communication system according to claim 4, wherein the transmission data is wirelessly received by the first communication apparatus from a transmission apparatus installed on earth.

6. The wireless communication system according to claim 1, wherein the third transceiver wirelessly communicates with the first communication apparatus and at least another one of the second communication apparatuses, wherein the second controller, when the second communication apparatus can communicate with the at least one of the reception apparatuses, transmits the transmission data received by the third transceiver, using the fourth transceiver, to the at least one of the reception apparatuses capable of communicating with the second communication apparatus, and wherein the second controller, when the second communication apparatus cannot communicate with the at least one of the reception apparatuses, transmits the transmission data received by the third transceiver, using the third transceiver, to the at least one another one of the second communication apparatuses capable of communicating with the second communication apparatus.

7. The wireless communication system according to claim 6, wherein the second controller, when the second communication apparatus can communicate with the at least one of the reception apparatuses, transmits the transmission data received by the third transceiver and transmission data acquired by the second communication apparatus, using the fourth transceiver, to the at least one of the reception apparatuses capable of communicating with the second communication apparatus, and wherein the second controller, when the second communication apparatus cannot communicate with the at least one of the reception apparatuses, transmits the transmission data received by the third transceiver and the transmission data acquired by the second communication apparatus, using the third transceiver, to the at least one another one of the second communication apparatuses capable of communicating with the second communication apparatus.

8. The wireless communication system according to claim 7, wherein the one or more first communication apparatuses and the one or more second communication apparatuses are provided in a low earth orbit satellite, the one or more reception apparatuses are installed on earth, the transmission data acquired by each of the first communication apparatuses is wirelessly received by each of the first communication apparatuses from one or more transmission apparatuses installed on earth, and the transmission data acquired by each of the second communication apparatuses is wirelessly received by each of the second communication apparatuses from one or more transmission apparatuses installed on earth.

9. The wireless communication system according to claim 1, wherein the first controller determines whether the first communication apparatus can communicate with the at least one of the reception apparatuses at a predetermined time on a basis of a time section in which the first communication apparatus can communicate with each one of the reception apparatuses, the time section being calculated in advance on a basis of a time-series position of each of the first communication apparatuses and a position of each of the reception apparatuses.

10. The wireless communication system according to claim 1, wherein the first controller determines the at least one of the second communication apparatuses capable of communicating with the first communication apparatus at a predetermined time on a basis of a time section in which the first communication apparatus can communicate with each one of the second communication apparatuses, the time section being calculated in advance on a basis of a time-series position of each of the first communication apparatuses and a time-series position of each of the second communication apparatuses.

11. The wireless communication system according to claim 1, wherein the transmission data with the high priority is received from a transmission apparatus with the high priority among a plurality of transmission apparatuses that transmits data.

12. Communication apparatuses in a wireless communication system including; a first communication apparatus that moves; a second communication apparatus that moves; and one or more reception apparatuses, the first communication apparatus comprising:

a first transceiver that wirelessly communicates with at least one of the reception apparatuses;

a second transceiver that wirelessly communicates with the second communication apparatus; and a controller that, when the first communication apparatus can communicate with the at least one of the reception apparatuses, transmits transmission data acquired by the first communication apparatus, using the first transceiver, to the at least one of the reception apparatuses capable of communicating with the first communication apparatus, wherein the controller, when the first communication apparatus cannot communicate with the at least one of the reception apparatuses, transmits the transmission data, using the second transceiver, to the second communication apparatus capable of communicating with the first communication apparatus and the at least one of the reception apparatuses, wherein the controller, when the first communication apparatus cannot communicate with the at least one of the reception apparatuses and the acquired transmission data has a high priority, transmits the transmission data, using the second transceiver, to the second communication apparatuses capable of communicating with the first communication apparatus, and wherein the controller, when the first communication apparatus cannot communicate with the at least one of the reception apparatuses and the acquired transmission data does not have the high priority, transmits, after the first communication apparatus becomes capable of communicating with the at least one of the reception apparatuses, the transmission data, using the first transceiver, to the at least one of the reception apparatuses capable of communicating with the first communication apparatus.

13. A wireless communication method of communication apparatuses in a wireless communication system including; a first communication apparatus that moves; a second communication apparatus that moves; and one or more reception apparatuses, the wireless communication method comprising:

transmitting, by the first communication apparatus, when the first communication apparatus can communicate with at least one of the reception apparatuses, transmission data acquired by the first communication apparatus, using a first transceiver that wirelessly communicates with the at least one of the reception apparatuses, to the at least one of the reception apparatuses capable of communicating with the first communication apparatus, and transmitting, by the first communication apparatus, when the first communication apparatus cannot communicate with the at least one of the reception apparatuses, the transmission data, using a second transceiver that wirelessly communicates with the second communication apparatus, to the second communication apparatus that capable of communicating with the first communication apparatus and the at least one of the reception apparatuses, wherein a controller of the first communication apparatus, when the first communication apparatus cannot communicate with the at least one of the reception apparatuses and the acquired transmission data has a high priority, transmits the transmission data, using the second transceiver, to the second communication apparatus capable of communicating with the first communication apparatus, and wherein the controller of the first communication apparatus, when the first communication apparatus cannot communicate with the at least one of the reception apparatuses and the acquired transmission data does not have the high priority, transmits, after the first communication apparatus becomes capable of communicating with the at least one of the reception apparatuses, the transmission data, using the first transceiver, to the at least one of the reception apparatuses capable of communicating with the first communication apparatus.

* * * * *